United States Patent
Akiya

(10) Patent No.: US 7,066,603 B2
(45) Date of Patent: Jun. 27, 2006

(54) CROSS DICHROIC PRISM AND REFLECTION TYPE LIQUID CRYSTAL PROJECTOR USING THE SAME

(75) Inventor: Shuji Akiya, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/665,549

(22) Filed: Sep. 22, 2003

(65) Prior Publication Data

US 2004/0105078 A1 Jun. 3, 2004

(30) Foreign Application Priority Data

Nov. 14, 2002 (JP) ............... 2002-330431

(51) Int. Cl.
*G03B 21/00* (2006.01)
*G03B 5/04* (2006.01)

(52) U.S. Cl. ............... 353/81; 353/33; 353/84; 359/834

(58) Field of Classification Search ............. 353/20, 353/331, 33, 81, 84; 359/490, 496, 500–502, 359/831, 837, 833, 834, 891; 349/9, 57, 349/80, 96, 97

See application file for complete search history.

(56) References Cited

U.S. PATENT DOCUMENTS

| 5,400,179 | A  | * | 3/1995  | Ito ............... 359/588 |
| 5,579,159 | A  | * | 11/1996 | Ito ............... 359/487 |
| 5,786,937 | A  | * | 7/1998  | Chu et al. ............... 359/583 |
| 6,478,429 | B1 | * | 11/2002 | Aritake et al. ............... 353/31 |
| 2002/0008770 | A1 | * | 1/2002 | Ho et al. ............... 348/336 |
| 2003/0071976 | A1 | * | 4/2003 | Okuyama et al. ............... 353/31 |

FOREIGN PATENT DOCUMENTS

JP    2001-209024    8/2001

* cited by examiner

*Primary Examiner*—W. B. Perkey
*Assistant Examiner*—Andrew Sever
(74) *Attorney, Agent, or Firm*—Snider & Associates; Ronald R. Snider

(57) ABSTRACT

A cross dichroic prism for color decomposition includes a blue-reflecting dichroic film for reflecting a blue light component and a red-reflecting dichroic film for reflecting a red light component. Each dichroic film comprises lower and higher refractive index materials alternately laminated on a prism base. The cross dichroic prism satisfies $1.105 \leq N_h/N_l \leq 1.450$ if $N_g \leq N_l$, or $1.118 \leq N_h/N_l \leq 1.150$ if $N_g > N_l$, where $N_g$ is the refractive index of the prism base, $N_h$ is the refractive index of the higher refractive index material, and $N_l$ is the refractive index of the lower refractive index material.

9 Claims, 16 Drawing Sheets

16: COLOR-DECOMPOSING CROSS DICHROIC PRISM
19: REFLECTION TYPE LCD
21: COLOR-COMBINING DICHROIC PRISM

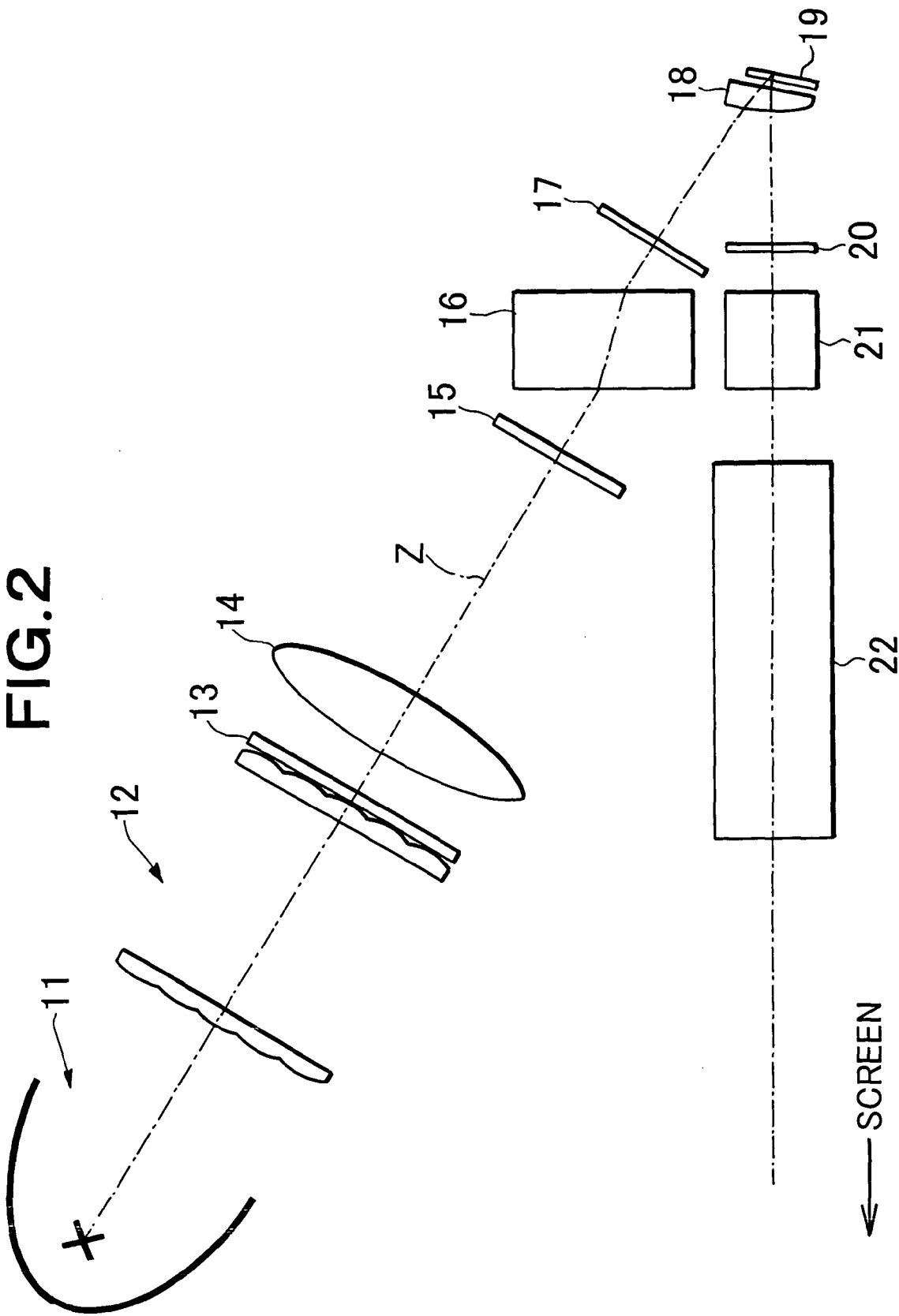

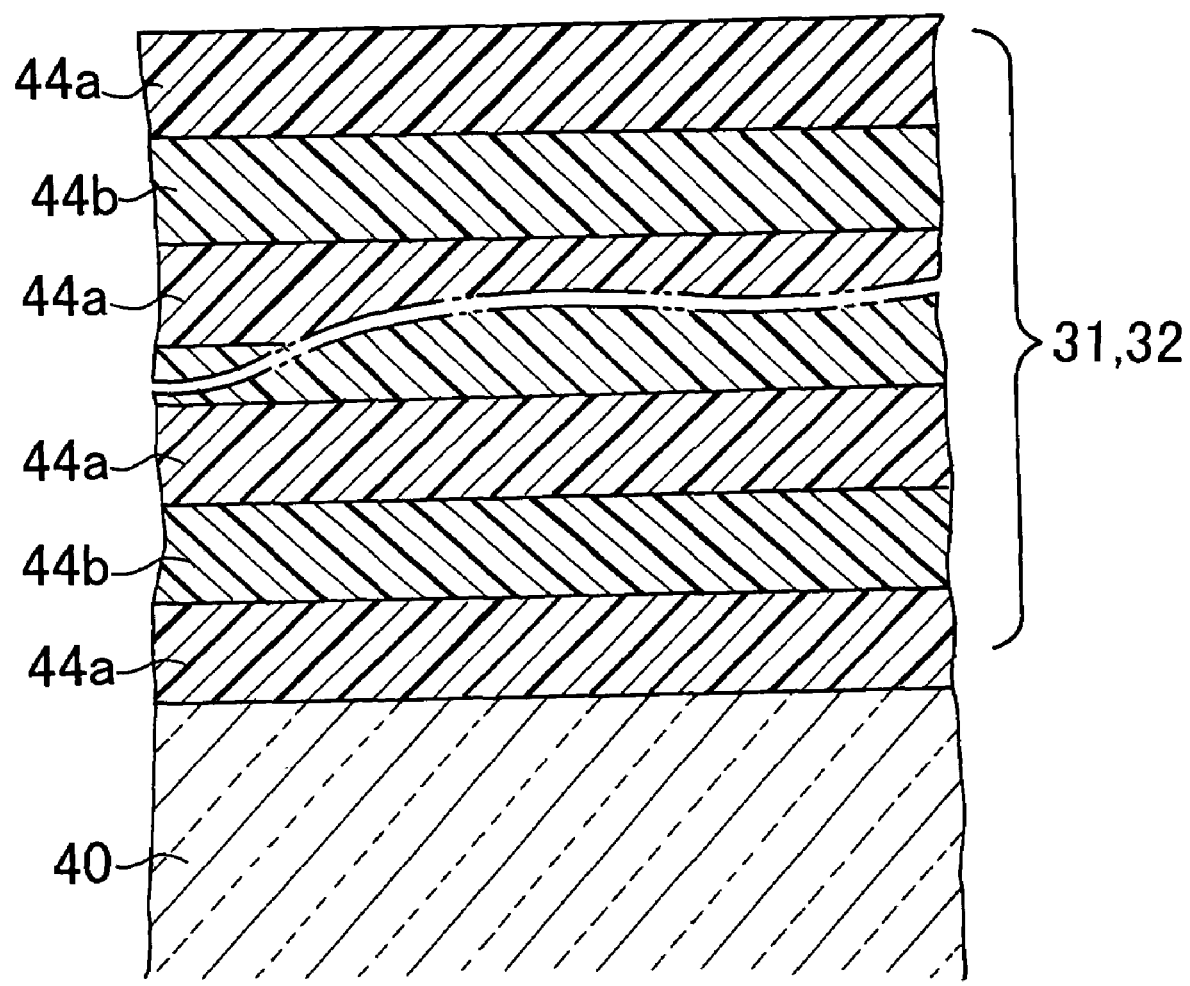

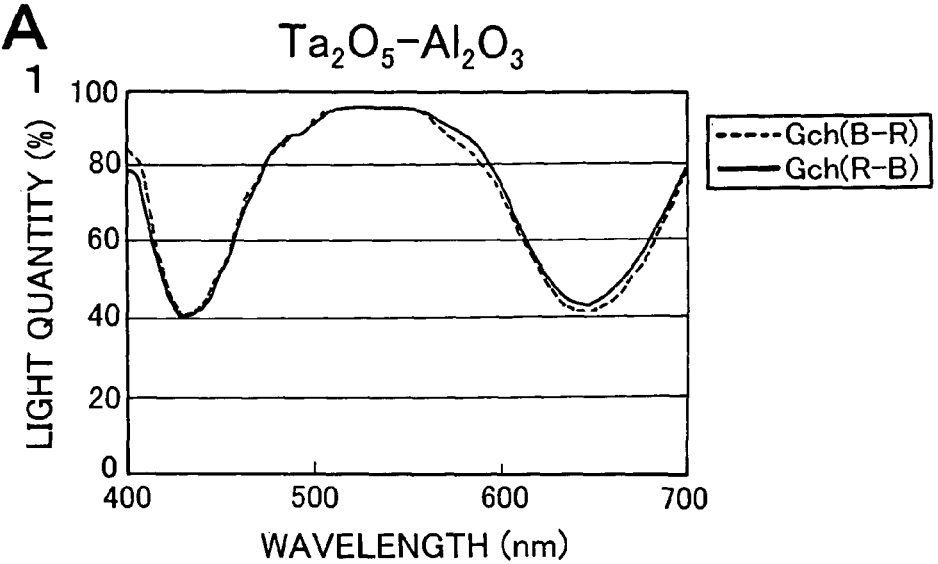
FIG.4A EXAMPLE 1
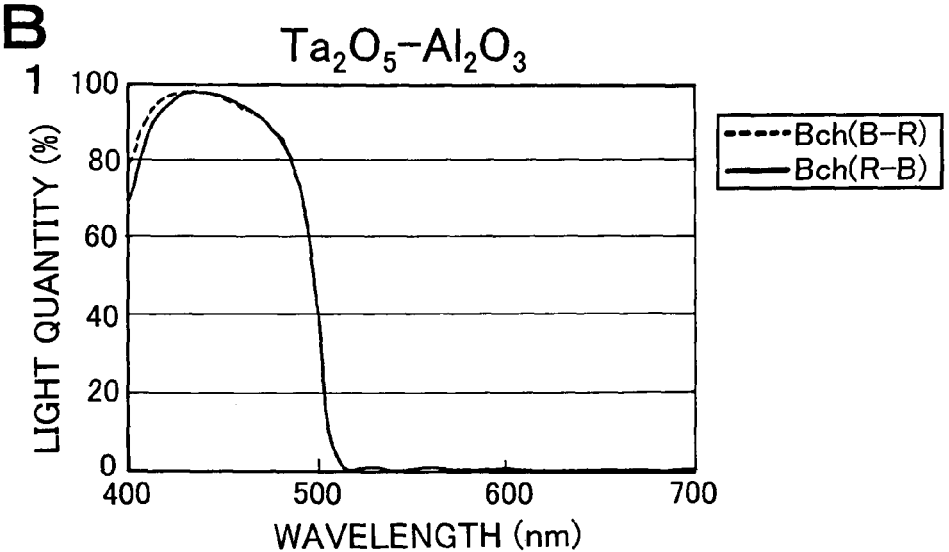
FIG.4B EXAMPLE 1
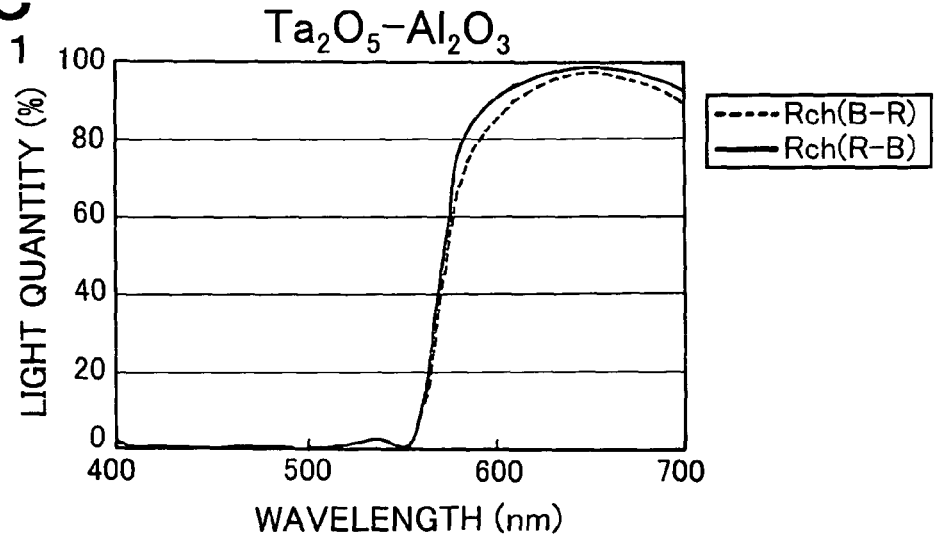
FIG.4C EXAMPLE 1

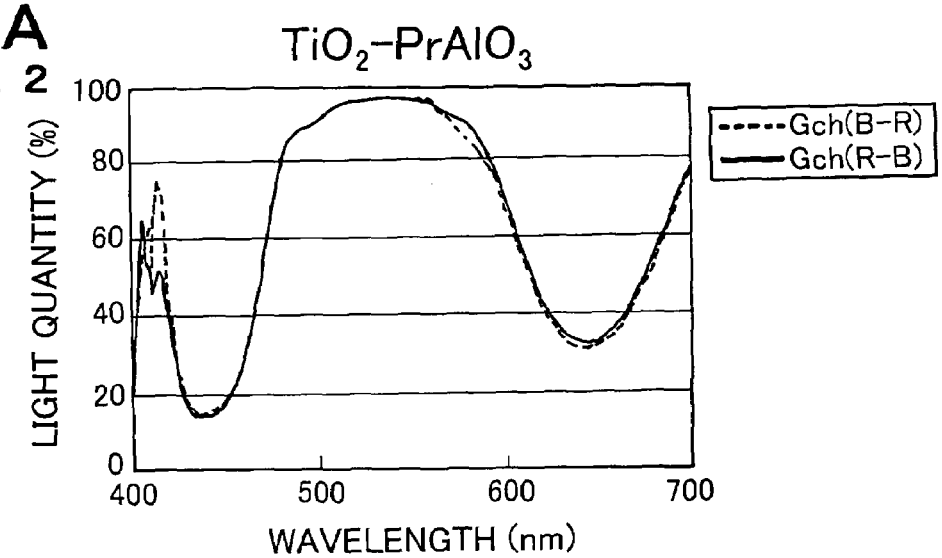
FIG.5A EXAMPLE 2
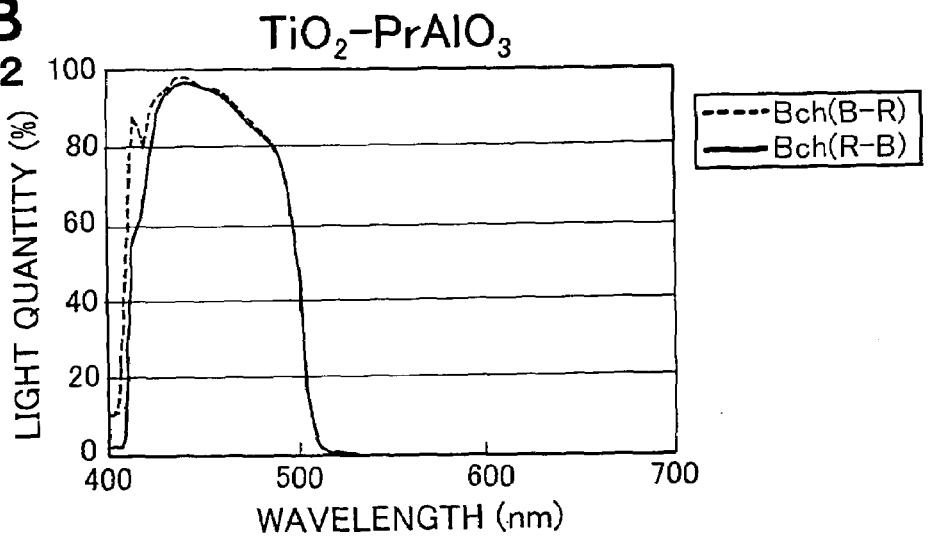
FIG.5B EXAMPLE 2
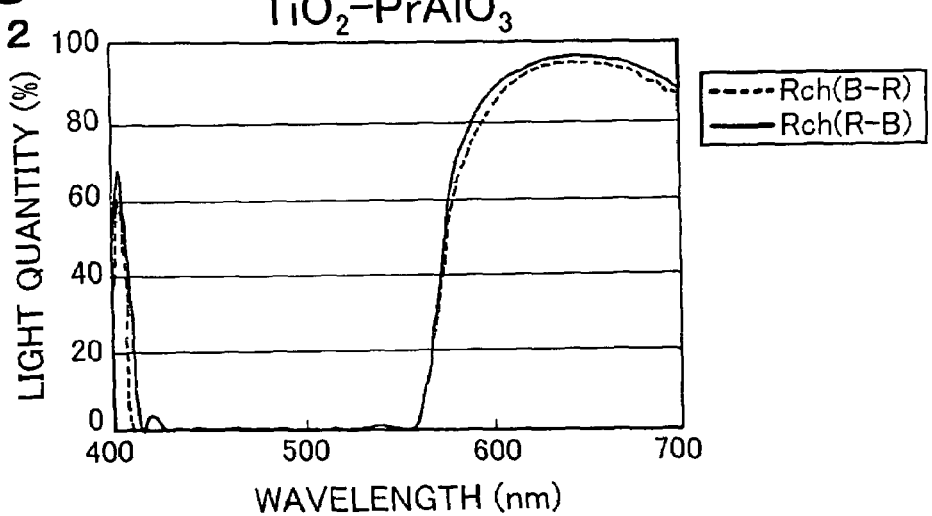
FIG.5C EXAMPLE 2

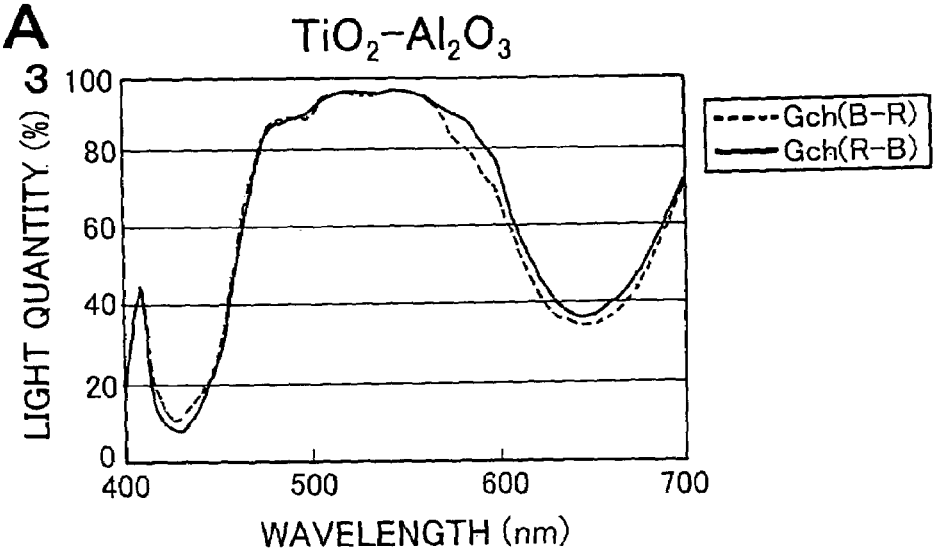
FIG.6A EXAMPLE 3
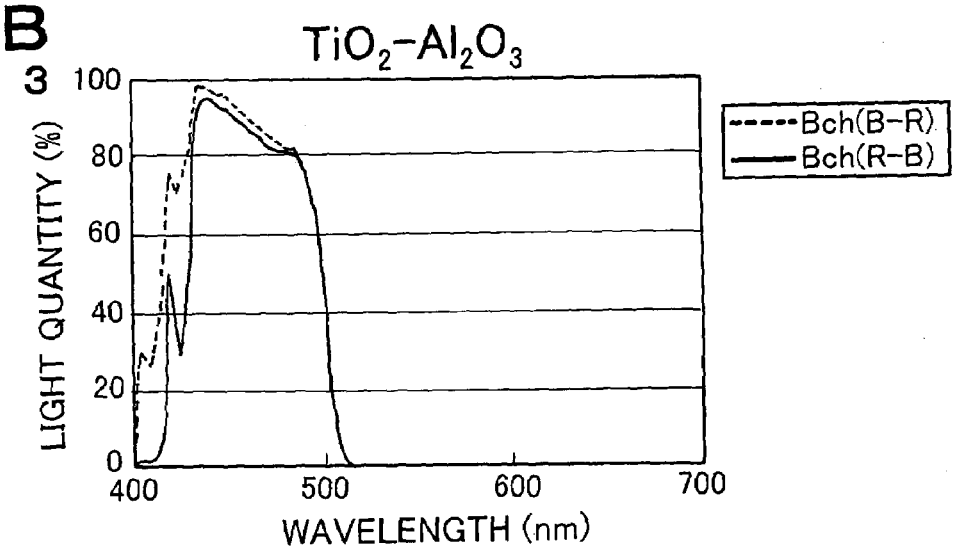
FIG.6B EXAMPLE 3
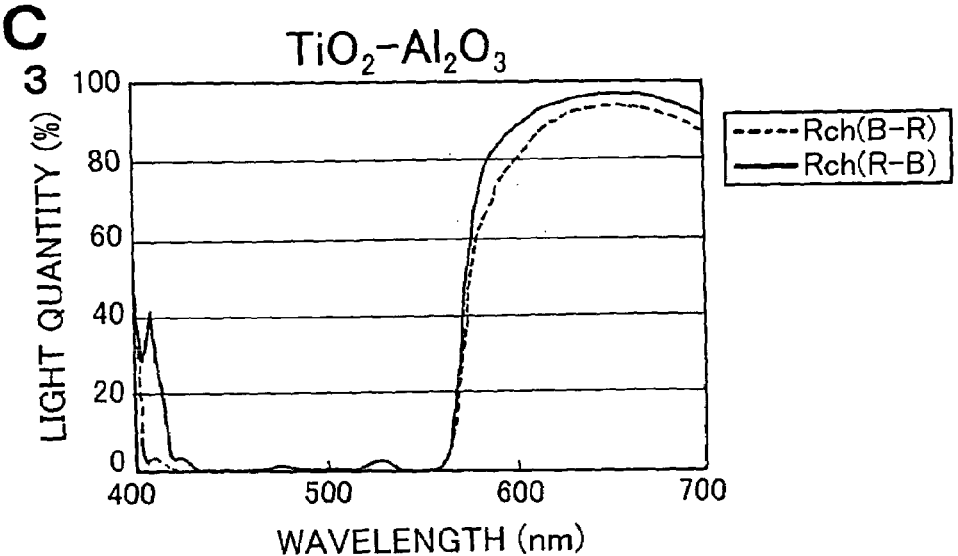
FIG.6C EXAMPLE 3

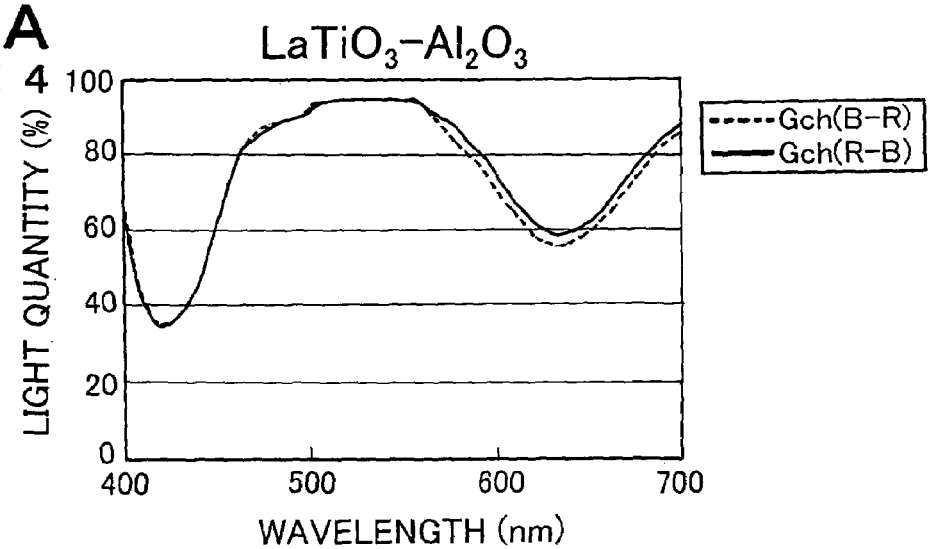
FIG.7A EXAMPLE 4
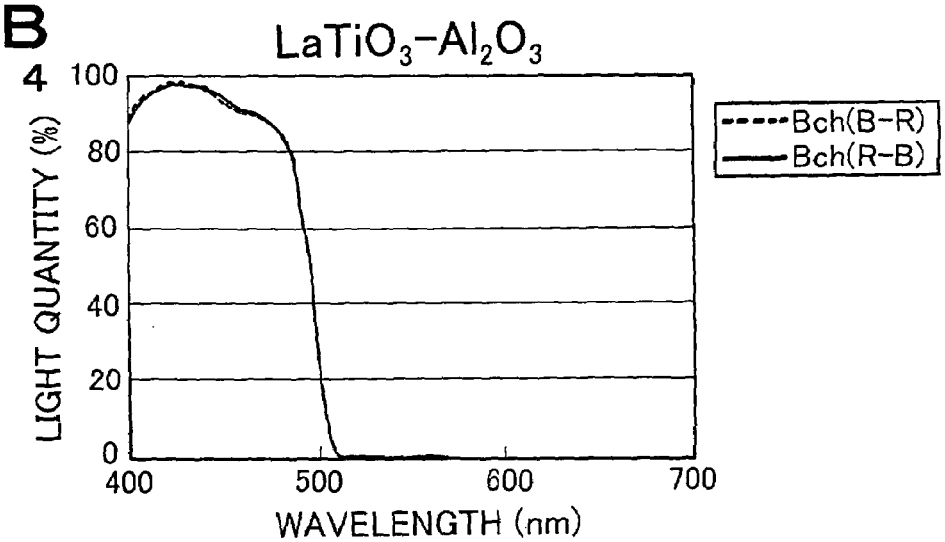
FIG.7B EXAMPLE 4
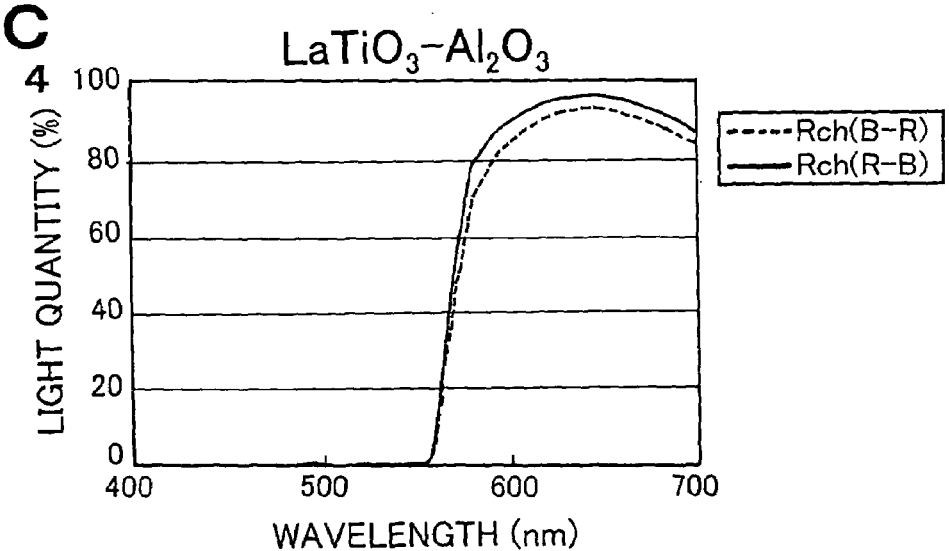
FIG.7C EXAMPLE 4

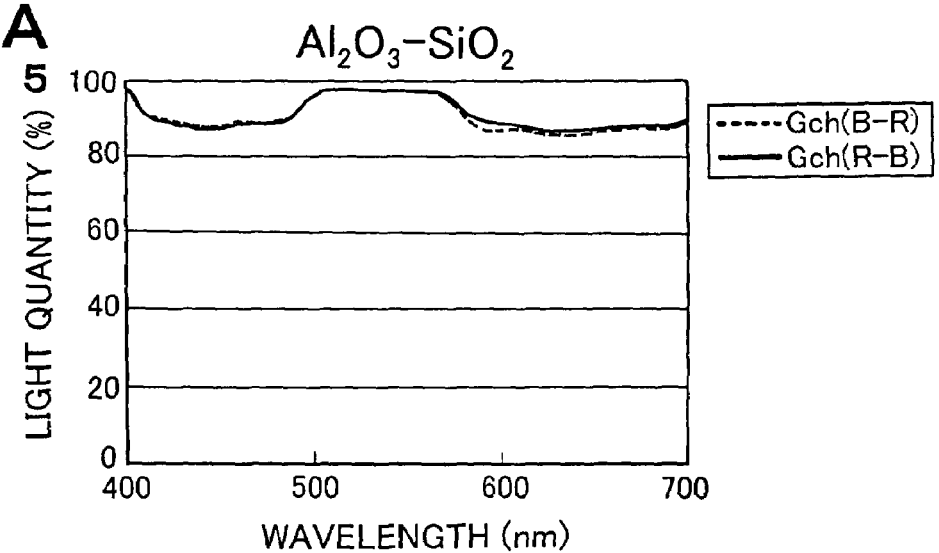
FIG.8A EXAMPLE 5
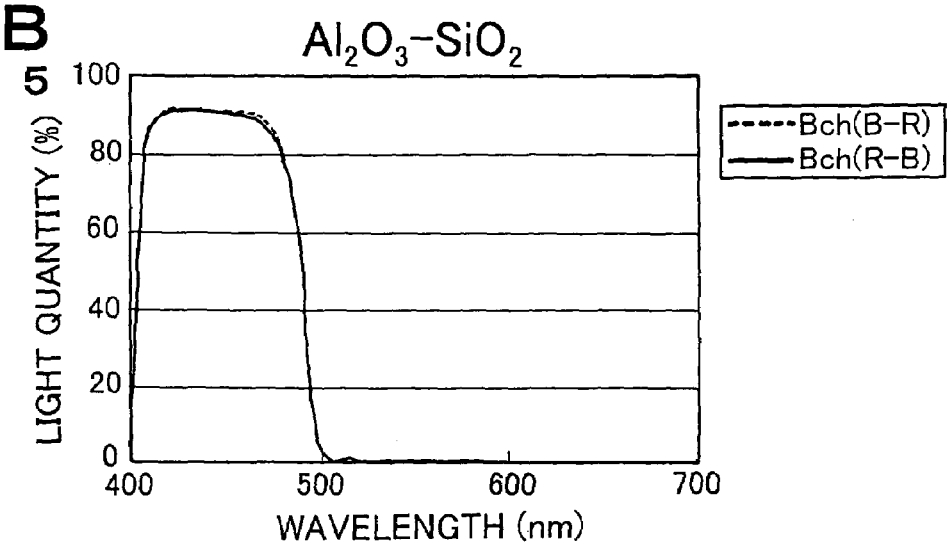
FIG.8B EXAMPLE 5
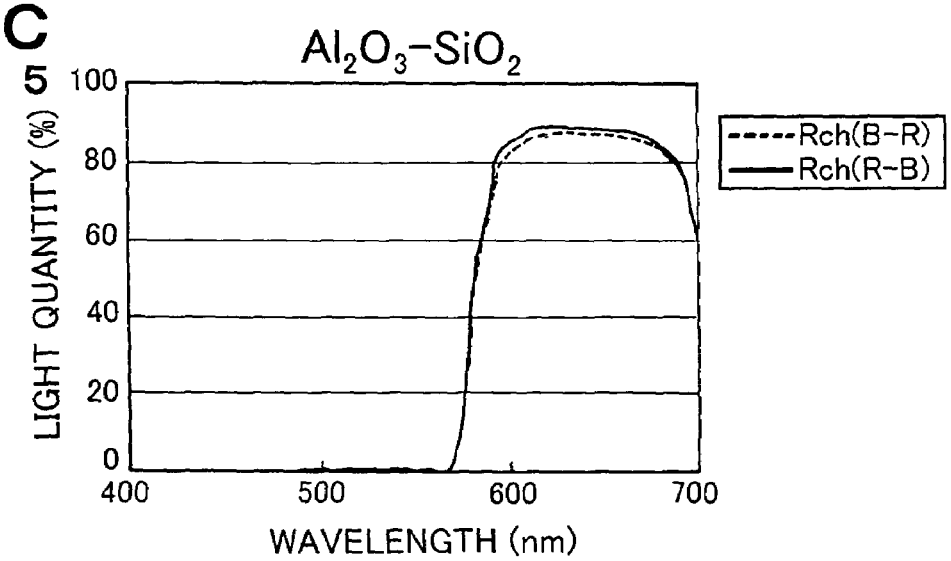
FIG.8C EXAMPLE 5

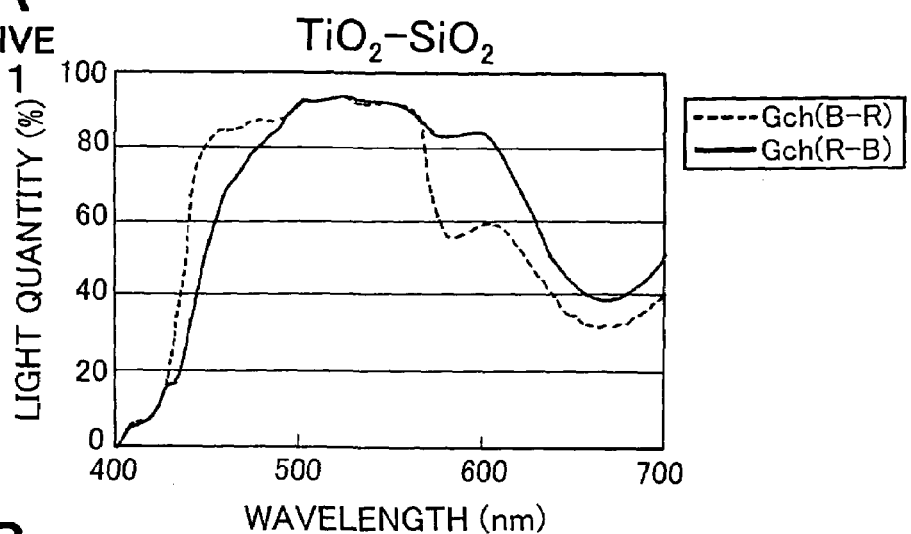
FIG.9A COMPARATIVE EXAMPLE 1
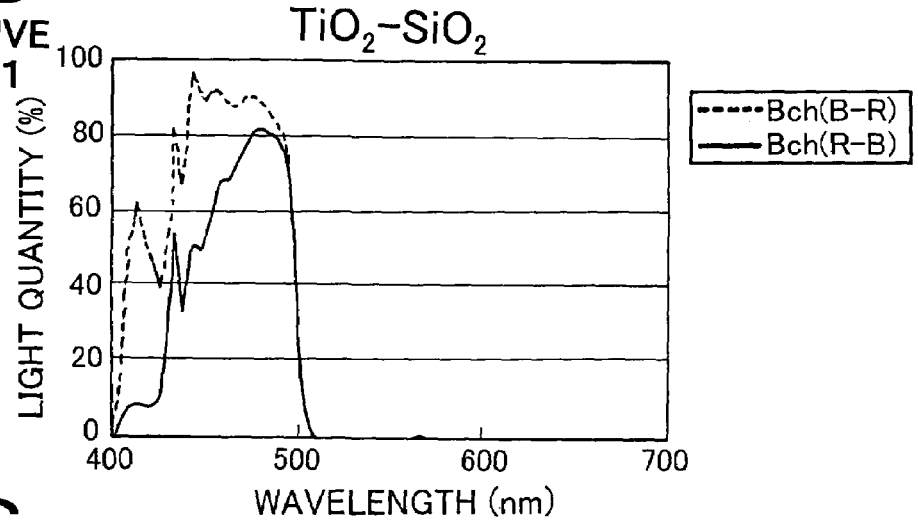
FIG.9B COMPARATIVE EXAMPLE 1
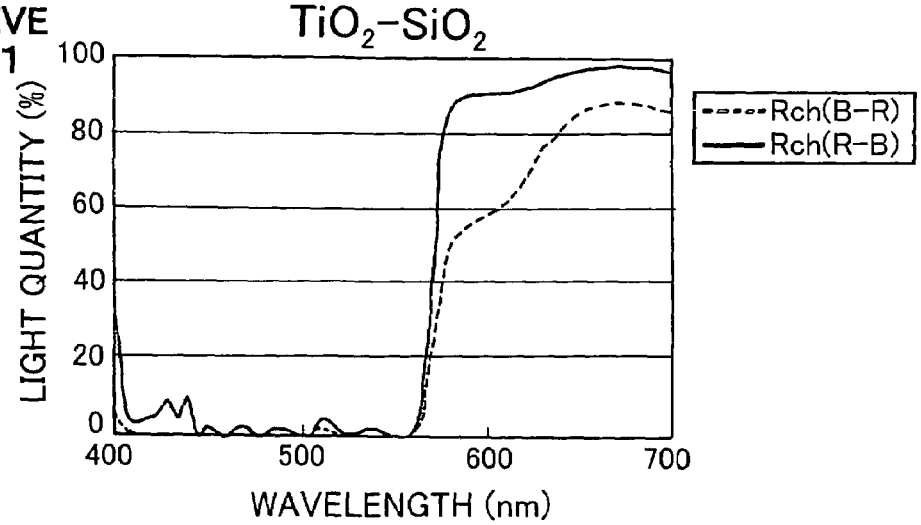
FIG.9C COMPARATIVE EXAMPLE 1

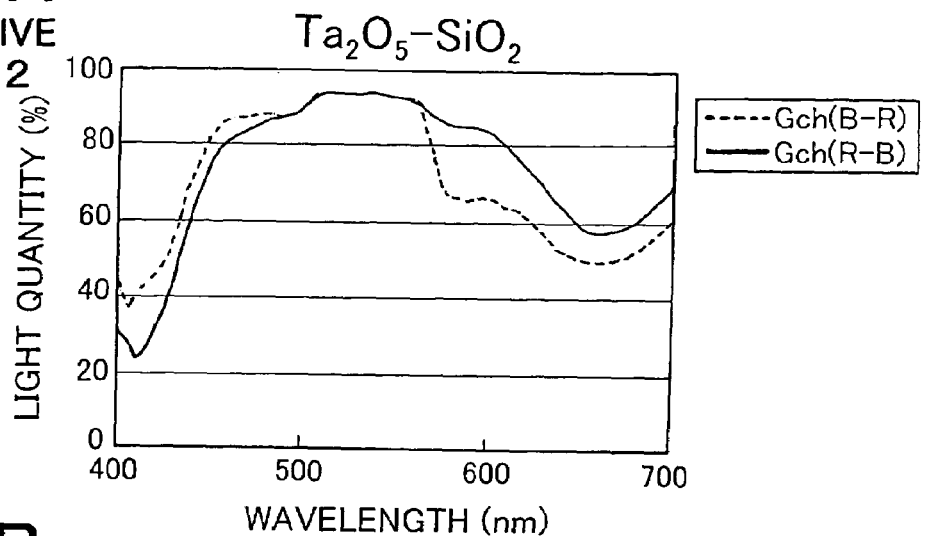
FIG.10A COMPARATIVE EXAMPLE 2
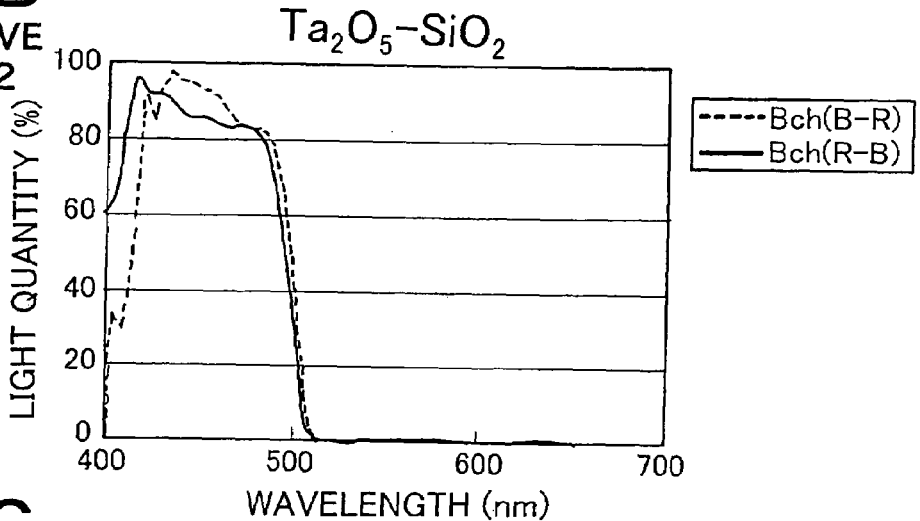
FIG.10B COMPARATIVE EXAMPLE 2
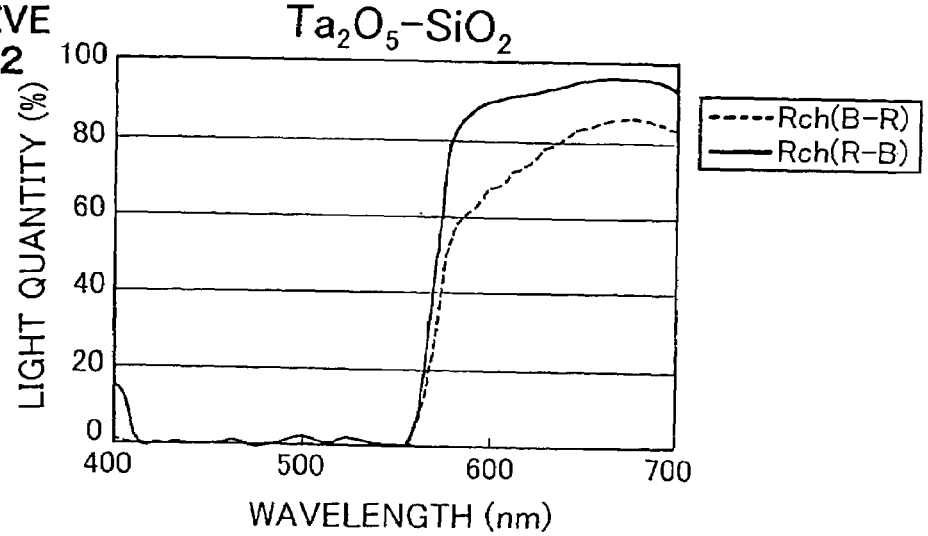
FIG.10C COMPARATIVE EXAMPLE 2

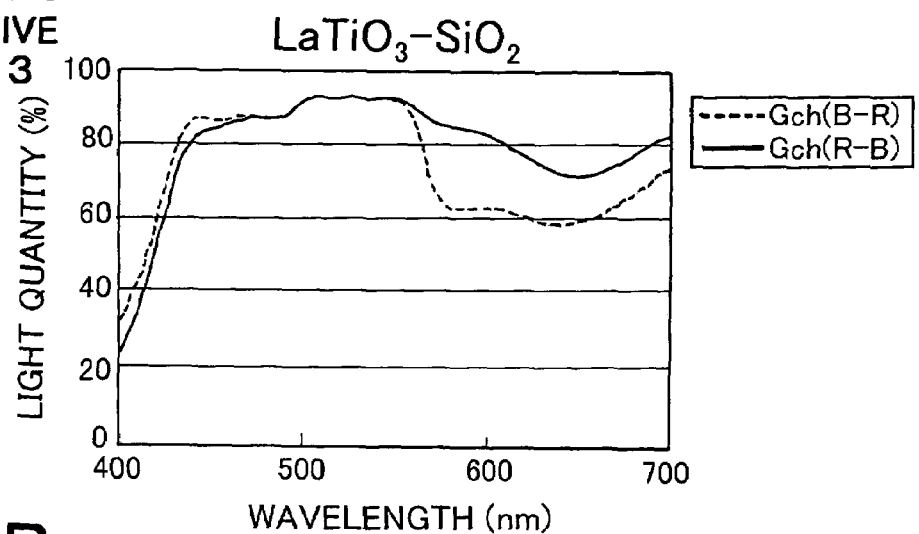
FIG.11A COMPARATIVE EXAMPLE 3
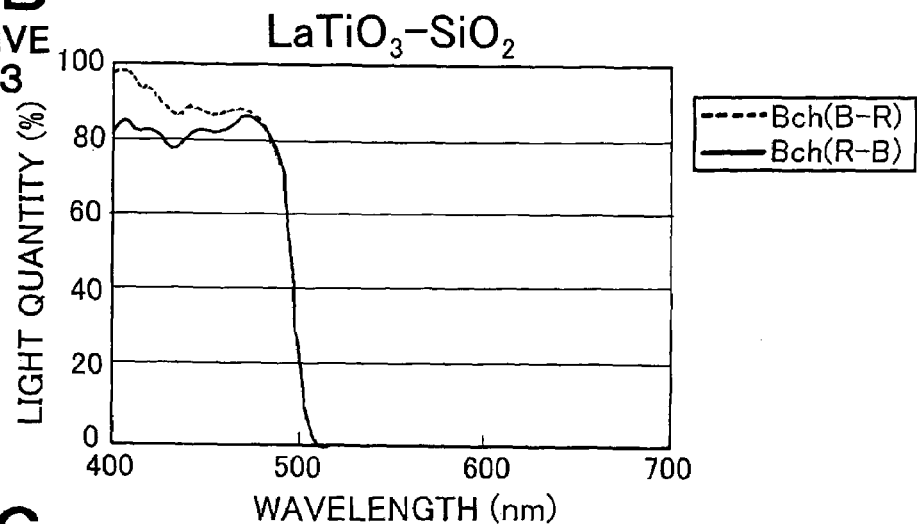
FIG.11B COMPARATIVE EXAMPLE 3
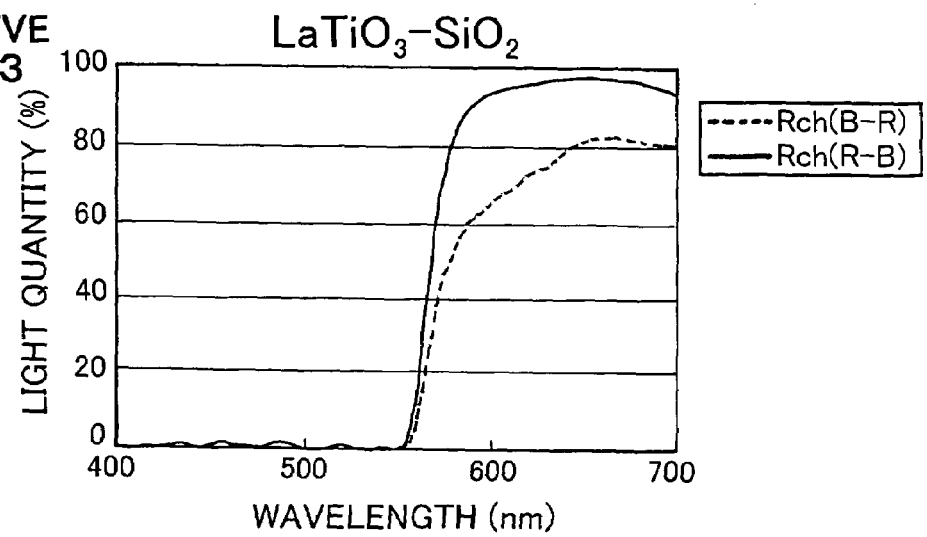
FIG.11C COMPARATIVE EXAMPLE 3

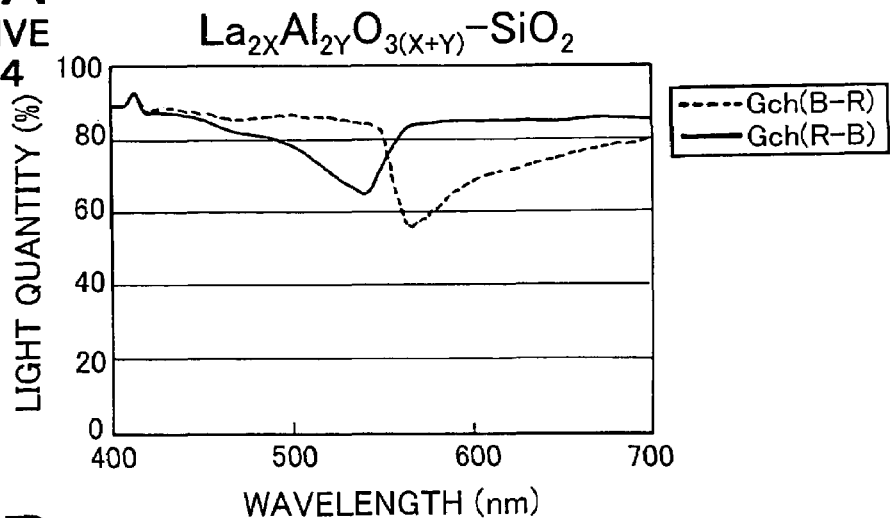
FIG.12A COMPARATIVE EXAMPLE 4
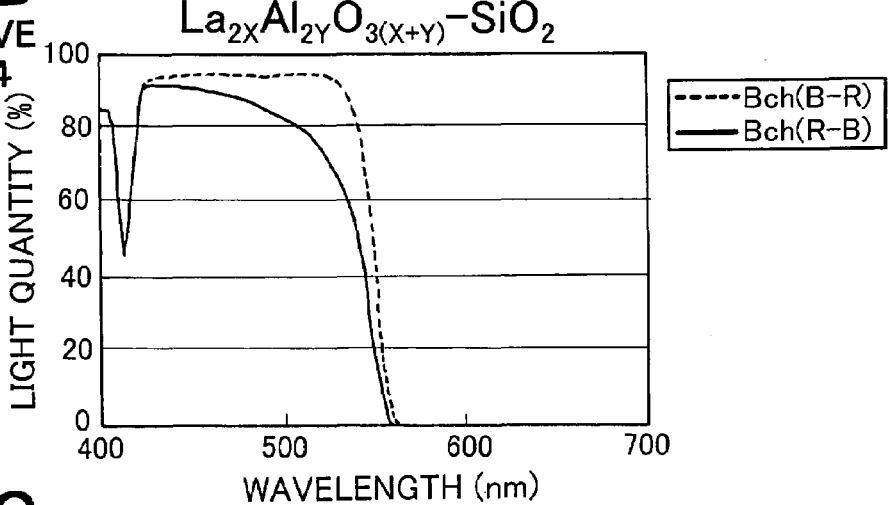
FIG.12B COMPARATIVE EXAMPLE 4
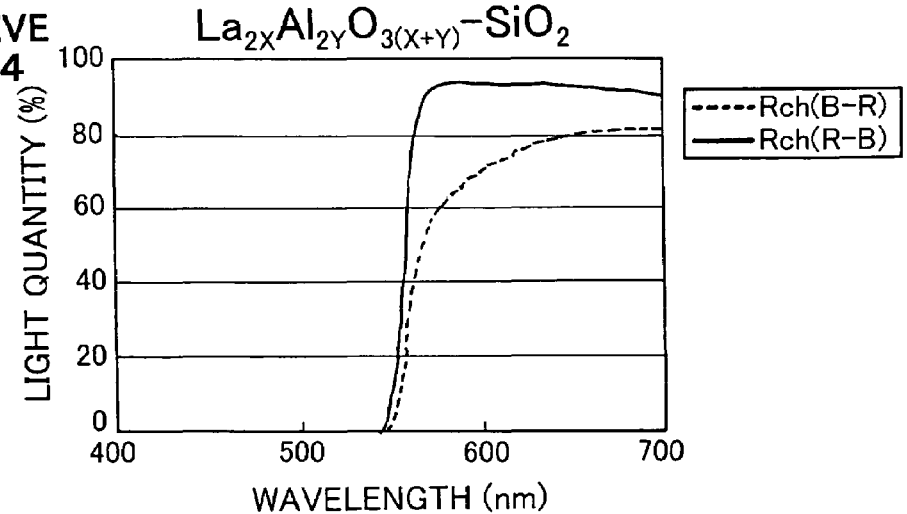
FIG.12C COMPARATIVE EXAMPLE 4

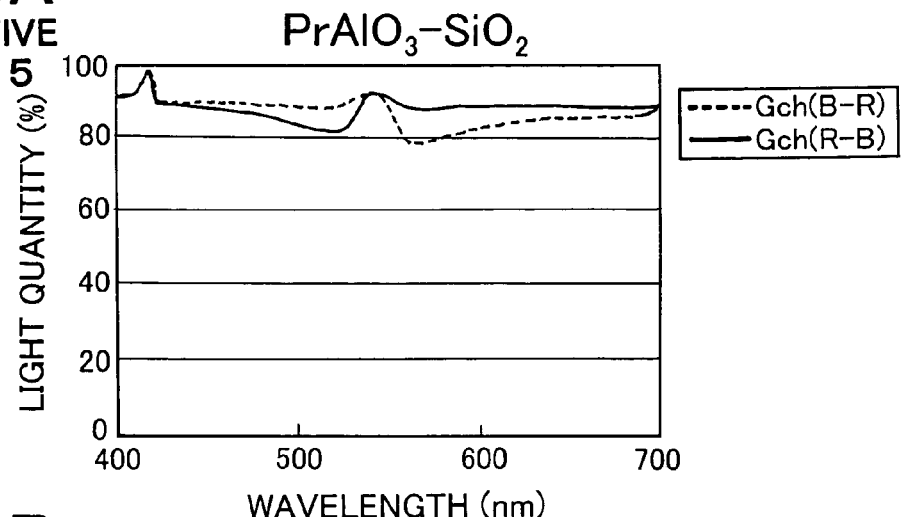
FIG.13A COMPARATIVE EXAMPLE 5
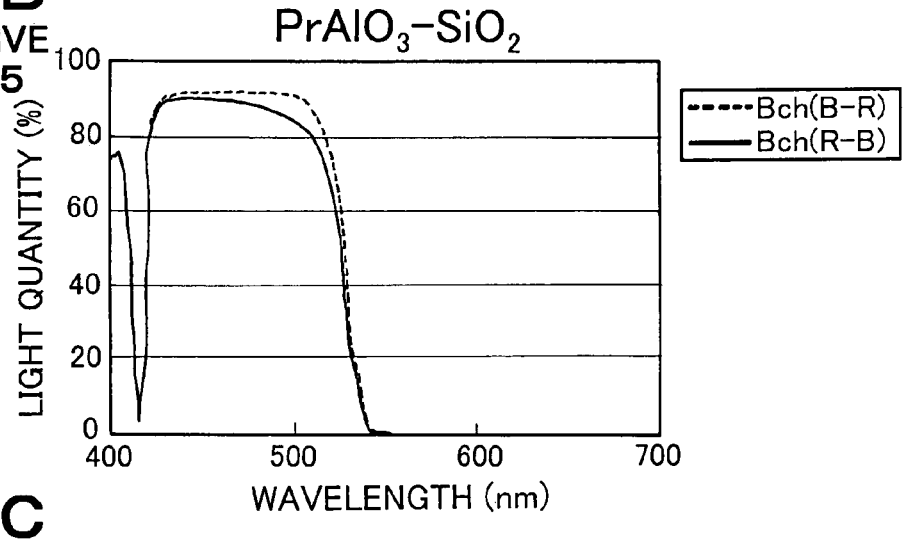
FIG.13B COMPARATIVE EXAMPLE 5
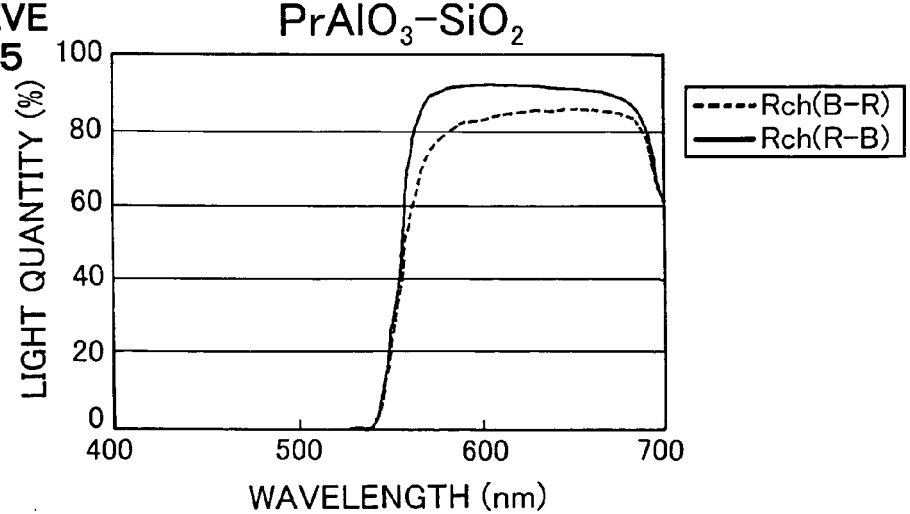
FIG.13C COMPARATIVE EXAMPLE 5

GREEN LIGHT BEAM

RED LIGHT BEAM

BLUE LIGHT BEAM

CROSS DICHROIC PRISM AND REFLECTION TYPE LIQUID CRYSTAL PROJECTOR USING THE SAME

RELATED APPLICATIONS

This application claims the priority of Japanese Patent Application No. 2002-330431 filed on Nov. 14, 2002, which is incorporated herein by reference.

BACKGROUND OF THE INVENTION

1. Field of the Invention

The present invention relates to a cross dichroic prism for decomposing a luminous flux from a light source into individual color light components in a reflection type color liquid crystal projector in which the luminous flux is made obliquely incident on a reflection type liquid crystal display device, and a reflection type liquid crystal projector mounted therewith.

2. Description of the Prior Art

In color-decomposing optical systems in reflection type liquid crystal color projectors, cross dichroic prisms for decomposing light source light into three color light components of red, green, and blue have conventionally been known.

For example, this kind of cross dichroic prism is used as shown in FIGS. 15A and 15B, which are a side view and a top plan view, respectively. Namely, light source light converted into S-polarized light is incident on a PBS prism 102 by way of a lens 101, and then is reflected by a polarization separating surface of the PBS prism 102. The reflected light is decomposed by a cross dichroic prism 103 into three color light components of red, green, and blue. The decomposed color light components are made incident on their corresponding reflection type liquid crystal display devices 104 to 106. The color light components incident on the reflection type liquid crystal display devices (known as LCOS in general) 104 to 106 are modulated by their corresponding image signals. Thus modulated color light components are converted into P-polarized light and are combined by the cross dichroic prism 103. Thus combined light is straightforwardly transmitted through the polarization separating surface of the PBS 102, and is projected onto an undepicted screen by a projection lens 107.

The above-mentioned cross dichroic prism 103, which performs color decomposition by two dichroic films each made of a multilayer film, is a glass prism in which a surface of a red-reflecting dichroic film 111 and a surface of a blue-reflecting dichroic film 112 are disposed substantially orthogonal to each other. Within the cross dichroic prism 103, each color light component passes through the surface of the red-reflecting dichroic film 111 and the surface of the blue-reflecting dichroic film 112 in succession as shown in FIGS. 16A to 16C, for example. Namely, the green light component passes through both the red-reflecting dichroic film 111 and blue-reflecting dichroic film 112. The red color light component is reflected by the red-reflecting dichroic film 111 and transmitted through the blue-reflecting dichroic film 112. The blue color light component is reflected by the blue-reflecting dichroic film 112 and transmitted through the red-reflecting dichroic film 111. Here, as shown in FIGS. 16A to 16C, color light components in the upper and lower halves of the luminous flux are incident on the two dichroic films 111, 112 in respective orders reversed from each other. When the luminous flux is perpendicularly incident on the cross dichroic prism 103 as shown in FIGS. 15A and 15B, orders in which the luminous flux passes through the dichroic films 111, 112 do not matter.

On the other hand, an oblique incidence type configuration (also known as off-axis type in general) has recently been known, which makes the luminous flux obliquely incident on a reflection type liquid crystal display device surface instead of making it perpendicularly incident as mentioned above. In such an oblique incidence type, the optical axis of the entrance-side optical system and that of the exit-side optical system do not overlap each other. Therefore, the PBS prism 102 used for separating the incident light and the outgoing light from each other in the prior art mentioned above is unnecessary, which makes it possible to prevent the manufacturing cost from rising, the optical axis from becoming heavier, and the optical design from being complicated by the use of PBS prism.

In the above-mentioned oblique incidence type, however, the luminous flux is also obliquely incident on the entrance surface of the cross dichroic prism for decomposing the incident light into the color light components. As a result, the incidence, reflection, and transmission of luminous flux cannot be discussed within a plane perpendicular to the axis of the cross dichroic prism 103 as shown in FIGS. 16A to 16C. So far, without conducting optical studies from such a viewpoint, the conventional cross dichroic prism 103 has been mounted as it is.

As verified by the inventors, however, the quantity of each color light component varies depending on the order of incidence on the dichroic films 111, 112 when the cross dichroic prism 103 used in the prior art as shown in FIGS. 15A and 15B is employed in the above-mentioned oblique incidence type as it is. Thus, as shown in each of FIGS. 16A to 16C, the quantity of light obtained may differ between the upper and lower halves of the incident luminous flux. As a result, the tint and optical intensity of images projected onto the screen may differ between right and left (or upper and lower) parts.

SUMMARY OF THE INVENTION

In order to overcome such a problem, it is an object of the present invention to provide a cross dichroic prism used in a color-decomposing optical system of an oblique incidence reflection type liquid crystal projector, which can prevent the quantity of light from being changed by different orders of incidence of the luminous flux on red- and blue-reflecting dichroic films, thereby establishing a favorable balance in the tint and optical intensity between right and left or upper and lower parts of images projected onto the screen; and a reflection type liquid crystal projector using the same.

The present invention provides a cross dichroic prism for color decomposition, the cross dichroic prism being mounted with a reflection type liquid crystal projector for making a luminous flux from a light source obliquely incident on a reflection type liquid crystal display device, the cross dichroic prism transmitting a green color light component therethrough and reflecting blue and red color light components into directions different from each other upstream of the reflection type liquid crystal display device;

the cross dichroic prism comprising a blue-reflecting dichroic film for reflecting the blue light component and a red-reflecting dichroic film for reflecting the red light component, each of the blue- and red-reflecting dichroic films comprising lower and higher refractive index materials alternately laminated on a prism base;

the cross dichroic prism satisfying the following conditional expressions (1) or (2):

$$1.105 \leq N_h/N_l \leq 1.450 \text{ if } N_g \leq N_l \quad (1), \text{ or}$$

$$1.118 \leq N_h/N_l \leq 1.150 \text{ if } N_g > N_l \quad (2)$$

where $N_g$ is the refractive index of the prism base, $N_h$ is the refractive index of the higher refractive index material, and $N_l$ is the refractive index of the lower refractive index material.

Here, the term "obliquely" means that the incident angle of the luminous flux on the light entrance surface of the prism within a cross section including an axis of the cross dichroic prism is 20 to 40 degrees.

Preferably, when the above-mentioned conditional expression (1) is satisfied, the higher refractive index material is a material selected from the group consisting of $Nb_2O_5$, $TiO_2$, $Ta_2O_5$, $LaTiO_3$, $HfO_2$, $ZrO_2$, and $La_{2X}Al_{2Y}O_{3(X+Y)}$, whereas the lower refractive index material is a material selected from the group consisting of $LaTiO_3$, $HfO_2$, $ZrO_2$, $La_{2X}Al_{2Y}O_{3(X+Y)}$, $Y_2O_3$, $PrAlO_3$, and $Al_2O_3$.

Preferably, when the above-mentioned conditional expression (2) is satisfied, the higher refractive index material is $Al_2O_3$, whereas the lower refractive index material is $SiO_2$.

Preferably, the prism base is a glass material made of BK7.

Preferably, the blue-reflecting dichroic film is constituted by 23 to 29 layers, whereas the red-reflecting dichroic film is constituted by 19 to 25 layers.

Preferably, in the blue- and red-reflecting dichroic films, at least one of lowermost and uppermost layers is a layer made of the lower refractive index material.

Preferably, at least one of the blue- and red-reflecting dichroic films is constituted by an odd number of layers.

The present invention provides a reflection type liquid crystal projector comprising the cross dichroic prism in accordance with the present invention, wherein the luminous flux from the light source is incident on an entrance surface of the cross dichroic prism at an angle making the luminous flux oblique to an axis of the cross dichroic prism.

BRIEF DESCRIPTION OF THE DRAWINGS

FIG. 2 is a schematic view showing the configuration of the reflection type liquid crystal projector in accordance with an embodiment of the present invention;

FIG. 3 is a schematic view showing the layer configuration of a dichroic film in the cross dichroic prism in accordance with an embodiment of the present invention;

FIGS. 4A to 4C are graphs showing respective wavelength characteristics measured for green, blue, and red color light components when color decomposition was carried out by using the cross dichroic prism in accordance with Example 1 of the present invention;

FIGS. 5A to 5C are graphs showing respective wavelength characteristics measured for green, blue, and red color light components when color decomposition was carried out by using the cross dichroic prism in accordance with Example 2 of the present invention;

FIGS. 6A to 6C are graphs showing respective wavelength characteristics measured for green, blue, and red color light components when color decomposition was carried out by using the cross dichroic prism in accordance with Example 3 of the present invention;

FIGS. 7A to 7C are graphs showing respective wavelength characteristics measured for green, blue, and red color light components when color decomposition was carried out by using the cross dichroic prism in accordance with Example 4 of the present invention;

FIGS. 8A to 8C are graphs showing respective wavelength characteristics measured for green, blue, and red color light components when color decomposition was carried out by using the cross dichroic prism in accordance with Example 5 of the present invention;

FIGS. 9A to 9C are graphs showing respective wavelength characteristics measured for green, blue, and red color light components when color decomposition was carried out by using the cross dichroic prism in accordance with Comparative Example 1 of the present invention;

FIGS. 10A to 10C are graphs showing respective wavelength characteristics measured for green, blue, and red color light components when color decomposition was carried out by using the cross dichroic prism in accordance with Comparative Example 2 of the present invention;

FIGS. 11A to 11C are graphs showing respective wavelength characteristics measured for green, blue, and red color light components when color decomposition was carried out by using the cross dichroic prism in accordance with Comparative Example 3 of the present invention;

FIGS. 12A to 12C are graphs showing respective wavelength characteristics measured for green, blue, and red color light components when color decomposition was carried out by using the cross dichroic prism in accordance with Comparative Example 4 of the present invention;

FIGS. 13A to 13C are graphs showing respective wavelength characteristics measured for green, blue, and red color light components when color decomposition was carried out by using the cross dichroic prism in accordance with Comparative Example 5 of the present invention;

DESCRIPTION OF THE PREFERRED EMBODIMENTS

Figure 1A:
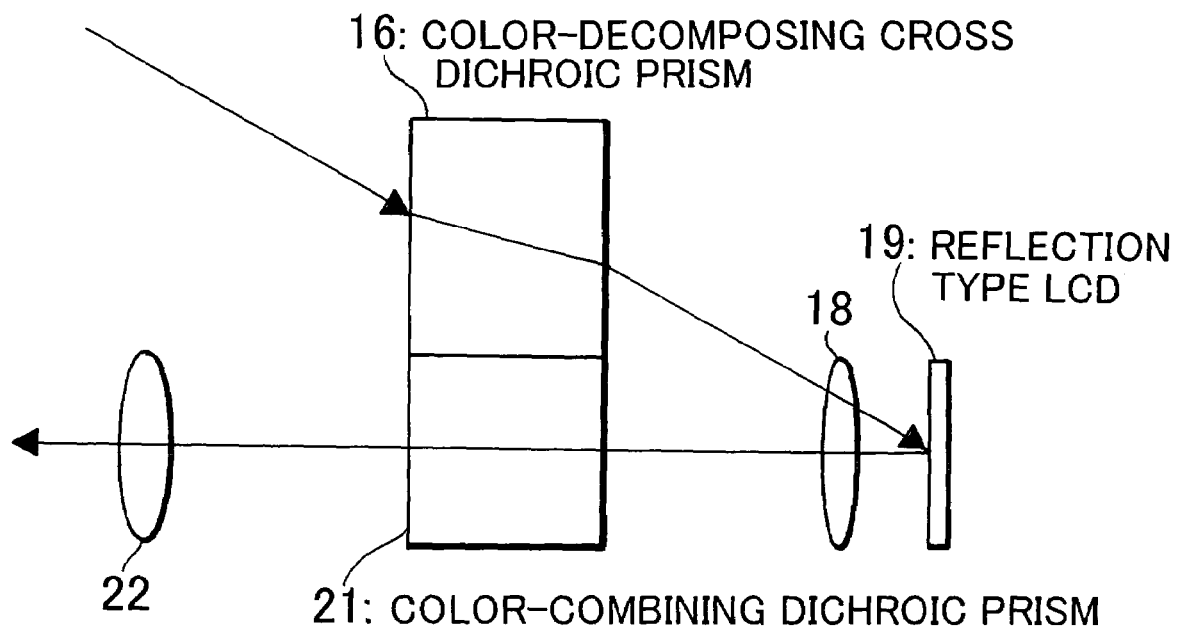
FIGS. 1A and 1B are a side view and a top plan view, respectively, each schematically explaining the relationship between the cross dichroic prism in accordance with an embodiment of the present invention and a luminous flux incident thereon.

In the following, embodiments of the cross dichroic prism in accordance with the present invention and a reflection type liquid crystal projector using the same will be explained with reference to the drawings.

FIG. 2 is a schematic diagram showing the reflection type liquid crystal projector in accordance with an embodiment. Though this projector is a color projector comprising respective reflection type liquid crystal display devices (referred to as LCOS) corresponding to red, green, and blue color light components, FIG. 2 shows only a reflection type liquid crystal display device for green light for convenience of explanation, and the following explanation will be centered on the green channel.

In FIG. 2, illumination light outputted as unpolarized white light from the light source 11 is homogenized in terms of light quantity within a cross section orthogonal to the optical axis Z by a fly-eye 12 constituted by a pair of lens array sheets. The whole luminous flux is converted into S-polarized light by a polarization converter (comb filter) 13. After the S-polarized light is transmitted through a condenser lens, only the green light component is converted into P-polarized light by a specific color light polarization converter 15, so as to be made incident on a cross dichroic prism 16 acting as a color-decomposing optical system.

In the luminous flux incident on the cross dichroic prism 16, the green light component (P-polarized light) is transmitted therethrough, whereas blue and red color light components are reflected in opposite directions (sideways), whereby the luminous flux is decomposed into three primary color light components. Thus separated green light component is made obliquely incident on a reflection type liquid crystal display device 19 for green light by way of a polarizer 17 for cutting noise light off and a lens 18.

Thereafter, the reflection type liquid crystal display device 19 displaying an image for green light outputs the green light component as S-polarized light carrying information of the image. After passing through the lens 18, the S-polarized light is converted into P-polarized light by a phase plate 20 for carrying out P-S polarization conversion, and then is made incident on a color-combining cross dichroic prism 21.

The red and blue light components separated by the cross dichroic prism 16 are caused to carry red and blue light images in red and blue channels configured substantially similar to the green channel mentioned above, respectively, and are made incident on the color-combining cross dichroic prism 21 sideways.

As a consequence, the color light components combined by the color-combining cross dichroic prism 21 are projected by a projection lens 22 onto an undepicted screen, whereby an image is displayed on the screen.

The light source 11 is provided with a reflector for effectively utilizing the light. For example, a metal halide lamp, a high-pressure mercury lamp, a tungsten halogen lamp, or the like is used as the light source 11.

Figure 1B:
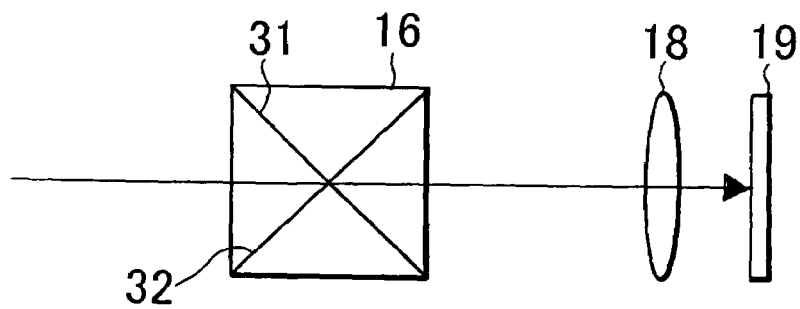

In the oblique incidence reflection type liquid crystal projector, as mentioned above, the luminous flux is obliquely incident on the entrance surface of the cross dichroic prism 16 decomposing the incident light into the individual color light components. Namely, as shown in FIGS. 1A and 1B, which are a side view and a top plan view, respectively, the incident light is incident on the entrance surface of the cross dichroic prism 16 perpendicularly when seen from the top (see FIG. 1B) and obliquely when seen sideways (see FIG. 1A). The incident angle of the luminous flux with respect to the entrance surface of the cross dichroic prism 16 within a cross section including the axis of the prism is about 20 to 40 degrees.

Figure 15A:
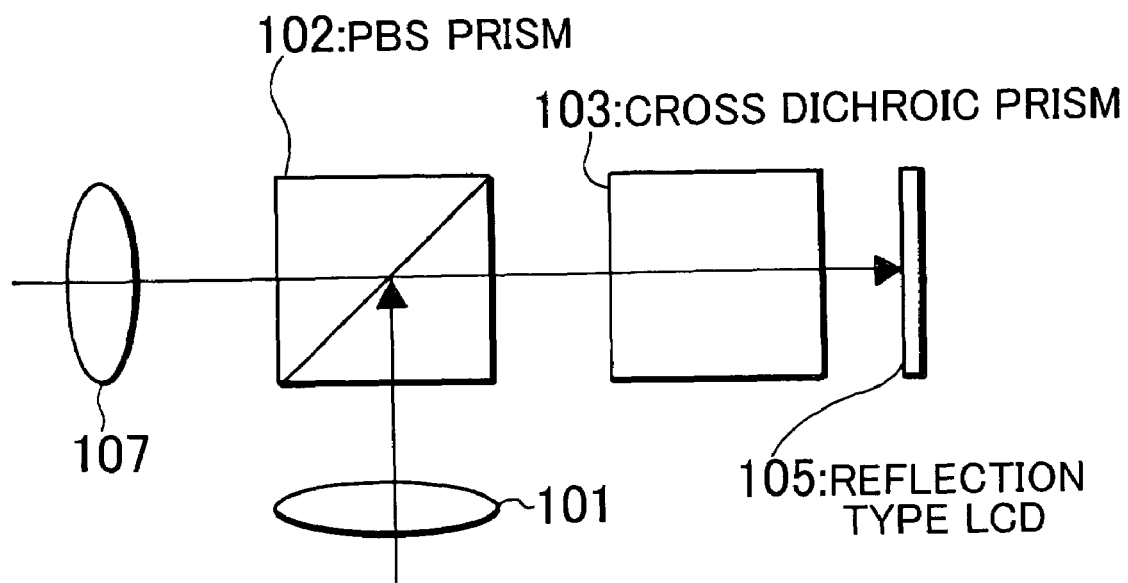
FIGS. 15A and 15B are a side view and a top plan view, respectively, for explaining the prior art.
Figure 15B:
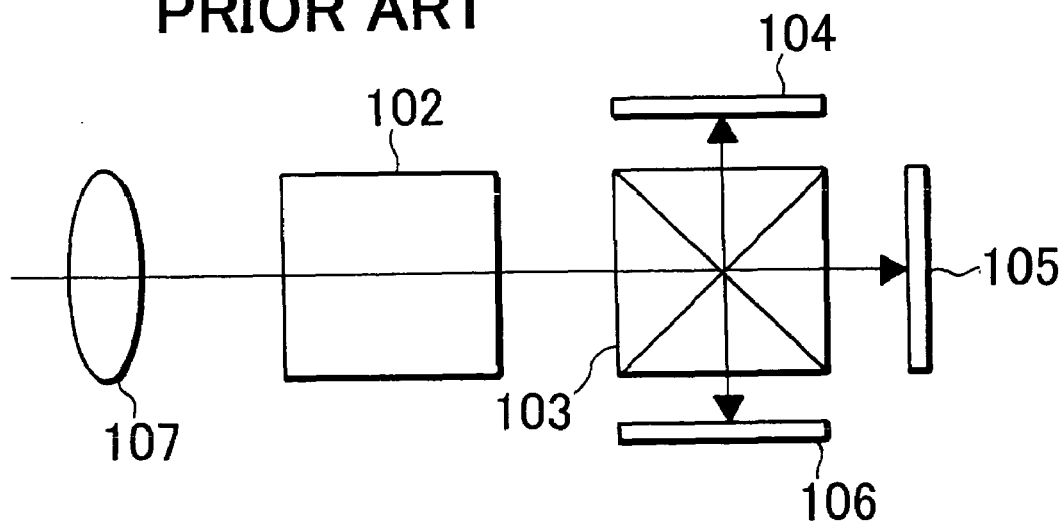
Figure 16A:
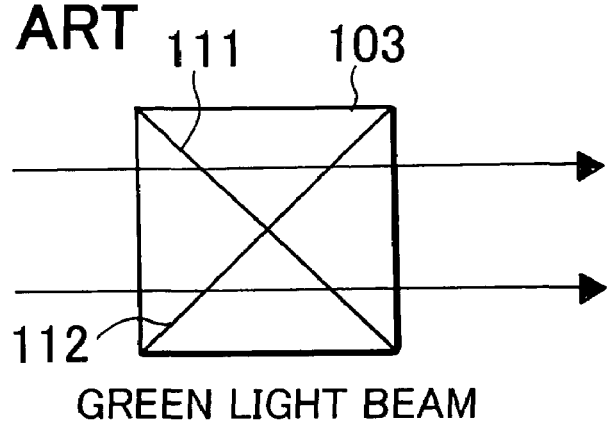
FIGS. 16A to 16C are schematic views for explaining a problem of the prior art in green, blue, and red light components, respectively.
Figure 16B:
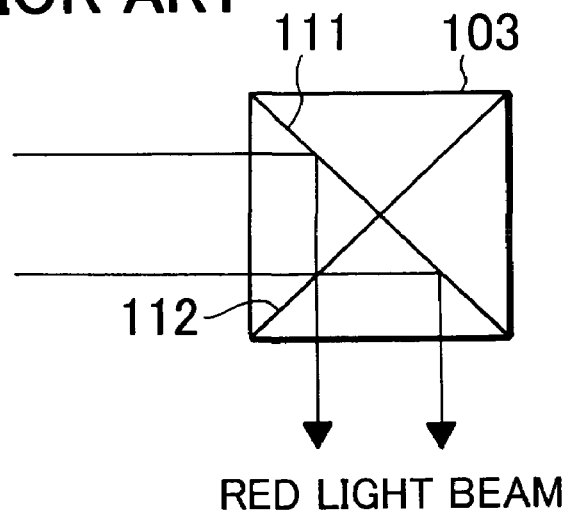
Figure 16C:
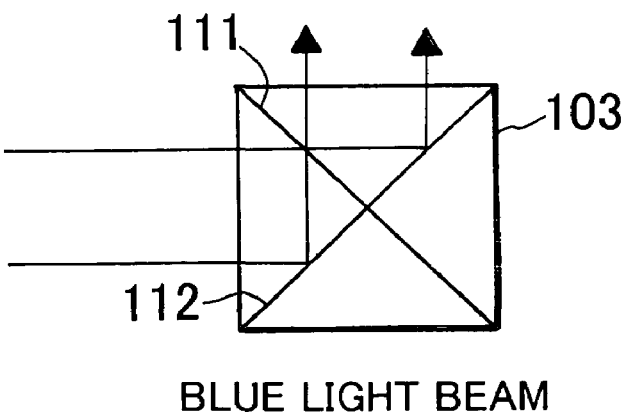

When the cross dichroic prism 103 used in the prior art as shown in FIGS. 15A and 15B is employed as it is, the quantity of color light components varies depending on the order of incidence of light on the dichroic films. Namely, the quantity of light obtained may differ between the upper and lower halves of the incident luminous flux as shown in FIGS. 16A to 16C, whereby the tint or optical intensity of images projected onto the screen may vary between right and left parts.

Therefore, in this embodiment, layer configurations (materials constituting layers, the number of layers, etc.) of the red-reflecting dichroic films 31 and blue-reflecting dichroic film 32 within the cross dichroic prism 16 are appropriately defined, so as to overcome the problem mentioned above.

FIG. 3 schematically shows the layer configuration of the dichroic film 31, 32 of the cross dichroic prism in accordance with an embodiment of the present invention.

The dichroic film 31, 32 is constituted by lower refractive index material layers 44a and higher refractive index material layers 44b which are alternately laminated on a prism base (glass substrate) 40. For laminating the layers, vapor deposition, sputtering, ion plating, or the like is used.

Each of the lowermost and uppermost layers of the dichroic film 31, 32 is a lower refractive index material layer 44a. The blue-reflecting dichroic film 32 is constituted by an odd number of layers consisting of 23 to 29 layers. The red-reflecting dichroic film 31 is constituted by an odd number of layers consisting of 19 to 25 layers.

The dichroic film 31, 32 satisfies the following conditional expression (1) or (2):

$$1.105 \leq N_h/N_l \leq 1.450 \text{ if } N_g \leq N_l \quad (1), \text{ or}$$

$$1.118 \leq N_h/N_l \leq 1.150 \text{ if } N_g > N_l \quad (2)$$

where $N_g$ is the refractive index of the prism base, $N_h$ is the refractive index of the higher refractive index material, and $N_l$ is the refractive index of the lower refractive index material.

The following Table 1 shows ranges satisfying the above-mentioned expression (1) or (2) in combinations of specific substances.

In Table 1, the range of combinations surrounded by the single line is a range satisfying the conditional expression (1), whereas the range of combinations surrounded by the double line is a range satisfying the conditional expression (2). In Table 1, names of materials to be chosen as higher refractive index materials and their refractive indices (at a wavelength of 632.8 nm) are arranged horizontally in the uppermost two rows, whereas names of materials to be chosen as lower refractive index materials and their refractive indices (at a wavelength of 632.8 nm) are arranged vertically in the leftmost two columns. For example, the value of 1.443 written in the area where the column of $Nb_2O_5$ and the row of $Al_2O_3$ intersect indicates the value of $N_h/N_l$ mentioned above. Since this area falls within the range of combinations surrounded by the thick single line, it indicates that the conditional expression (1) is satisfied when $Nb_2O_5$ and $Al_2O_3$ are chosen as higher and lower refractive index materials, respectively.

As the prism base (glass substrate) 40 for laminating the dichroic film 31, 32 thereon, BK7 (having a refractive index of 1.5146) is used because of its favorable optical characteristics, excellent film laminating property, and low cost.

Specifically, when $Nb_2O_5$ or $TiO_2$ is chosen as the higher refractive index material, one of $LaTiO_3$, $HfO_2$, $ZrO_2$, $La_{2X}Al_{2Y}O_{3(X+Y)}$, $Y_2O_3$, $PrAlO_3$, and $Al_2O_3$ is chosen as the lower refractive index material.

When $Ta_2O_5$ is chosen as the higher refractive index material, one of $HfO_2$, $ZrO_2$, $La_{2X}Al_{2Y}O_{3(X+Y)}$, $Y_2O_3$, $PrAlO_3$, and $Al_2O_3$ is chosen as the lower refractive index material.

When $LaTiO_3$ is chosen as the higher refractive index material, one of $Y_2O_3$, $PrAlO_3$, and $Al_2O_3$ is chosen as the lower refractive index material.

When $La_{2X}Al_{2Y}O_{3(X+Y)}$ is chosen as the higher refractive index material, $Al_2O_3$ is chosen as the lower refractive index material.

When $Al_2O_3$ is chosen as the higher refractive index material, $SiO_2$ is chosen as the lower refractive index material. This combination also satisfies the conditional expression (2) and the suitability for manufacturing.

LaTiO$_3$, PrAlO$_3$, and La$_{2X}$Al$_{2Y}$O$_{3(X+Y)}$ mentioned above have been well known under the product names of Substance H4 Patinal, Substance M1 Patinal, and Substance M3 Patinal (each being a registered trademark of Merck), respectively.

Thus configured cross dichroic prism of this embodiment can prevent the outgoing light quantity from being changed by different orders of incidence of the luminous flux on red- and blue-reflecting dichroic films, thereby establishing a favorable balance in the tint and optical intensity between right and left parts of images projected onto the screen.

Also, the advantageous effect mentioned above can be promoted by any of (i) forming each of the lowermost and uppermost layer of the dichroic film by the lower refractive index material layer, (ii) constructing the blue-reflecting dichroic film by an odd number of layers consisting of 23 to 29 layers, and (iii) constructing the red-reflecting dichroic film by an odd number of layers consisting of 19 to 25 layers.

Without being restricted to the above-mentioned embodiment, the cross dichroic prism of the present invention and the reflection type liquid crystal projector using the same can be modified in various manners. For example, layer forming materials are not restricted to those of the above-mentioned embodiment, and it is possible to combine various materials which can satisfy the above-mentioned conditional expression (1) or (2).

For example, OH-5 (manufactured by Optron; TiO$_2$+ZrO$_2$), Substance H1 Patinal ((registered trademark) manufactured by Merck; TiO$_2$+ZrO$_2$), Substance H5 Patinal ((registered trademark) manufactured by Merck; LaTi$_x$O$_y$), and the like may be used as the higher refractive index material. On the other hand, OM-4 (manufactured by Optron; Al$_2$O$_3$+ZrO$_2$), OM-6 (manufactured by Optron; Al$_2$O$_3$+ZrO$_2$), and the like may be used as the lower refractive index material.

The lowermost layer and/or uppermost layer of the dichroic film may be the higher refractive index material, whereas an even number of layers may be provided.

Without being restricted to BK7, various base materials having favorable optical characteristics and excellent film laminating properties may be used as the base for the cross dichroic prism.

Figure 14A:
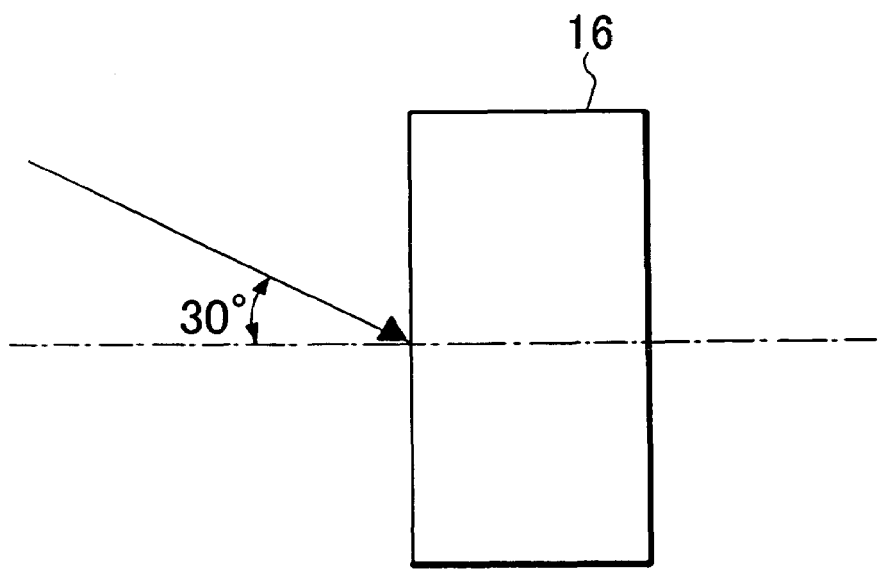
FIGS. 14A and 14B are a side view and a top plan view, respectively, for explaining a condition for measuring wavelength characteristics of cross dichroic prisms in accordance with Examples and Comparative Examples of the present invention.
Figure 14B:
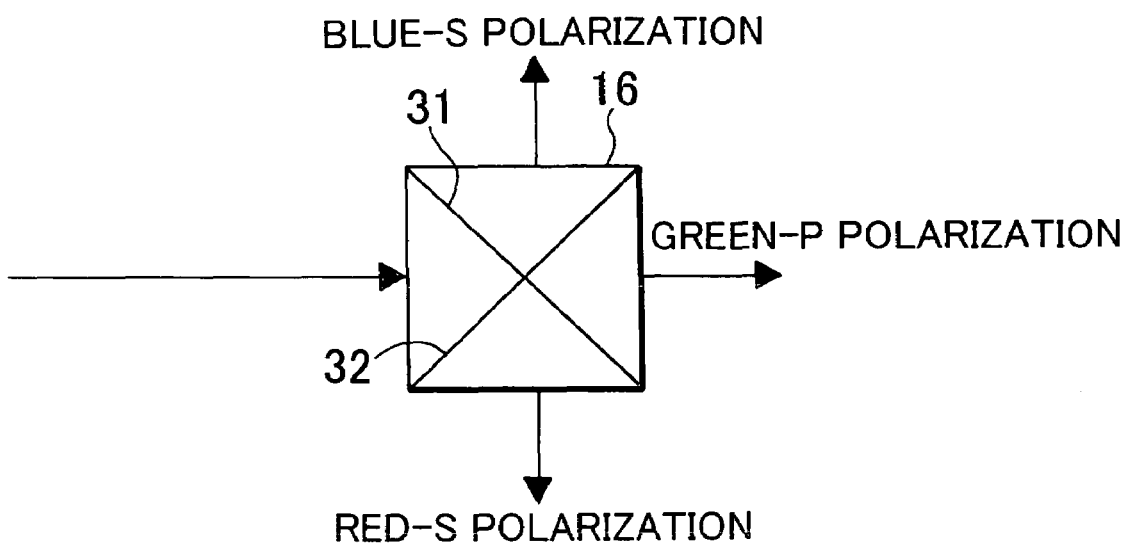

The present invention will now be explained in further detail with reference to specific examples. FIGS. 14A and 14B are a side view and a top plan view, respectively, for explaining a condition for measuring wavelength characteristics of cross dichroic prisms in accordance with the following Examples and Comparative Examples.

EXAMPLE 1

The dichroic film in the cross dichroic prism in accordance with Example 1 employed BK7 as its prism base, whereas lower refractive index material layers (having a refractive index N$_l$ of 1.646) made of Al$_2$O$_3$ and higher refractive index material layers (having a refractive index N$_h$ of 2.213) made of Ta$_2$O$_5$ were alternatively laminated on the prism base by vapor deposition.

Each of the lowermost layer (first layer) and topmost layer of the dichroic film was a lower refractive index material layer made of Al$_2$O$_3$. The blue-reflecting dichroic film was constituted by 23 layers, whereas the red-reflecting dichroic film was constituted by 19 layers.

The following Table 2 shows materials constituting individual layers of each dichroic film and their physical film thickness values.

Using the cross dichroic prism in accordance with Example 1, wavelength characteristics were measured for each color light component when color decomposition was carried out under the incidence condition (with an incident light wavelength of 632.8 nm) shown in FIGS. 15A and 15B, which are a side view and a top plan view, respectively. The value of N$_h$/N$_l$ in this example was 1.344, thus satisfying the conditional expression (1).

FIGS. 4A to 4C (indicating green, blue, and red light components, respectively, as in FIGS. 5A to 13C) show measured results. As can be seen from FIGS. 4A to 4C, the characteristics obtained when the luminous flux was initially incident on the blue-reflecting dichroic film and then on the red-reflecting dichroic film (B-R curves (indicated by dotted lines)) and those obtained when the luminous flux was initially incident on the red-reflecting dichroic film and then on the blue-reflecting dichroic film (R-B curves (indicated by solid lines)) substantially coincided with each other.

EXAMPLE 2

The dichroic film in the cross dichroic prism in accordance with Example 2 employed BK7 as its prism base, whereas lower refractive index material layers (having a refractive index N$_l$ of 1.715) made of PrAlO$_3$ and higher refractive index material layers (having a refractive index N$_h$ of 2.350) made of TiO$_2$ were alternatively laminated on the prism base by vapor deposition.

Each of the lowermost layer (first layer) and topmost layer of the dichroic film was a lower refractive index material layer made of PrAlO$_3$. The blue-reflecting dichroic film was constituted by 23 layers, whereas the red-reflecting dichroic film was constituted by 19 layers.

Using the cross dichroic prism in accordance with Example 2, wavelength characteristics were measured for each color light component when color decomposition was carried out under the incidence condition (with an incident light wavelength of 632.8 nm) shown in FIGS. 15A and 15B, which are a side view and a top plan view, respectively. The value of N$_h$/N$_l$ in this example was 1.371, thus satisfying the conditional expression (1).

FIGS. 5A to 5C show measured results. As can be seen from FIGS. 5A to 5C, the characteristics obtained when the luminous flux was initially incident on the blue-reflecting dichroic film and then on the red-reflecting dichroic film (B-R curves (indicated by dotted lines)) and those obtained when the luminous flux was initially incident on the red-reflecting dichroic film and then on the blue-reflecting dichroic film (R-B curves (indicated by solid lines)) substantially coincided with each other.

EXAMPLE 3

The dichroic film in the cross dichroic prism in accordance with Example 3 employed BK7 as its prism base, whereas lower refractive index material layers (having a refractive index N$_l$ of 1.646) made of Al$_2$O$_3$ and higher refractive index material layers (having a refractive index N$_h$ of 2.350) made of TiO$_2$ were alternatively laminated on the prism base by vapor deposition.

Each of the lowermost layer (first layer) and topmost layer of the dichroic film was a lower refractive index material layer made of Al$_2$O$_3$. The blue-reflecting dichroic film was constituted by 23 layers, whereas the red-reflecting dichroic film was constituted by 19 layers.

Using the cross dichroic prism in accordance with Example 3, wavelength characteristics were measured for each color light component when color decomposition was carried out under the incidence condition (with an incident light wavelength of 632.8 nm) shown in FIGS. 15A and 15B, which are a side view and a top plan view, respectively. The value of $N_h/N_l$ in this example was 1.427, thus satisfying the conditional expression (1).

FIGS. 6A to 6C show measured results. As can be seen from FIGS. 6A to 6C, the characteristics obtained when the luminous flux was initially incident on the blue-reflecting dichroic film and then on the red-reflecting dichroic film (B-R curves (indicated by dotted lines)) and those obtained when the luminous flux was initially incident on the red-reflecting dichroic film and then on the blue-reflecting dichroic film (R-B curves (indicated by solid lines)) substantially coincided with each other.

EXAMPLE 4

The dichroic film in the cross dichroic prism in accordance with Example 4 employed BK7 as its prism base, whereas lower refractive index material layers (having a refractive index $N_l$ of 1.646) made of $Al_2O_3$ and higher refractive index material layers (having a refractive index $N_h$ of 2.081) made of $LaTiO_3$ were alternatively laminated on the prism base by vapor deposition.

Each of the lowermost layer (first layer) and topmost layer of the dichroic film was a lower refractive index material layer made of $Al_2O_3$. The blue-reflecting dichroic film was constituted by 23 layers, whereas the red-reflecting dichroic film was constituted by 19 layers.

Using the cross dichroic prism in accordance with Example 4, wavelength characteristics were measured for each color light component when color decomposition was carried out under the incidence condition (with an incident light wavelength of 632.8 nm) shown in FIGS. 15A and 15B, which are a side view and a top plan view, respectively. The value of $N_h/N_l$ in this example was 1.264, thus satisfying the conditional expression (1).

FIGS. 7A to 7C show measured results. As can be seen from FIGS. 7A to 7C, the characteristics obtained when the luminous flux was initially incident on the blue-reflecting dichroic film and then on the red-reflecting dichroic film (B-R curves (indicated by dotted lines)) and those obtained when the luminous flux was initially incident on the red-reflecting dichroic film and then on the blue-reflecting dichroic film (R-B curves (indicated by solid lines)) substantially coincided with each other.

EXAMPLE 5

The dichroic film in the cross dichroic prism in accordance with Example 5 employed BK7 as its prism base, whereas lower refractive index material layers (having a refractive index $N_l$ of 1.470) made of $SiO_2$ and higher refractive index material layers (having a refractive index $N_h$ of 1.646) made of $Al_2O_3$ were alternatively laminated on the prism base by vapor deposition.

Each of the lowermost layer (first layer) and topmost layer of the dichroic film was a lower refractive index material layer made of $SiO_2$. The blue-reflecting dichroic film was constituted by 27 layers, whereas the red-reflecting dichroic film was constituted by 25 layers.

The following Table 3 shows materials constituting individual layers of each dichroic film and their physical film thickness values.

Using the cross dichroic prism in accordance with Example 5, wavelength characteristics were measured for each color light component when color decomposition was carried out under the incidence condition (with an incident light wavelength of 632.8 nm) shown in FIGS. 15A and 15B, which are a side view and a top plan view, respectively. The value of $N_h/N_l$ in this example was 1.120, thus satisfying the conditional expression (2).

FIGS. 8A to 8C show measured results. As can be seen from FIGS. 8A to 8C, the characteristics obtained when the luminous flux was initially incident on the blue-reflecting dichroic film and then on the red-reflecting dichroic film (B-R curves (indicated by dotted lines)) and those obtained when the luminous flux was initially incident on the red-reflecting dichroic film and then on the blue-reflecting dichroic film (R-B curves (indicated by solid lines)) substantially coincided with each other.

Comparative Example 1

The dichroic film in the cross dichroic prism in accordance with Comparative Example 1 employed BK7 as its prism base, whereas lower refractive index material layers (having a refractive index $N_l$ of 1.470) made of $SiO_2$ and higher refractive index material layers (having a refractive index $N_h$ of 2.350) made of $TiO_2$ were alternatively laminated on the prism base by vapor deposition.

Each of the lowermost layer (first layer) and topmost layer of the dichroic film was a lower refractive index material layer made of $SiO_2$. The blue-reflecting dichroic film was constituted by 23 layers, whereas the red-reflecting dichroic film was constituted by 17 layers.

Using the cross dichroic prism in accordance with Comparative Example 1, wavelength characteristics were measured for each color light component when color decomposition was carried out under the incidence condition (with an incident light wavelength of 632.8 nm) shown in FIGS. 15A and 15B, which are a side view and a top plan view, respectively. Though $N_g > N_l$ in this comparative example, the value of $N_h/N_l$ was 1.599, thus failing to satisfy any of the conditional expressions (1) and (2).

FIGS. 9A to 9C show measured results. As can be seen from FIGS. 9A to 9C, large deviations were measured between the characteristics obtained when the luminous flux was initially incident on the blue-reflecting dichroic film and then on the red-reflecting dichroic film (B-R curves (indicated by dotted lines)) and those obtained when the luminous flux was initially incident on the red-reflecting dichroic film and then on the blue-reflecting dichroic film (R-B curves (indicated by solid lines)).

Comparative Example 2

The dichroic film in the cross dichroic prism in accordance with Comparative Example 2 employed BK7 as its prism base, whereas lower refractive index material layers (having a refractive index $N_l$ of 1.470) made of $SiO_2$ and higher refractive index material layers (having a refractive index $N_h$ of 2.213) made of $Ta_2O_5$ were alternatively laminated on the prism base by vapor deposition.

Each of the lowermost layer (first layer) and topmost layer of the dichroic film was a lower refractive index material layer made of $SiO_2$. The blue-reflecting dichroic film was constituted by 23 layers, whereas the red-reflecting dichroic film was constituted by 17 layers.

The following Table 4 shows materials constituting individual layers of each dichroic film and their physical film thickness values.

Using the cross dichroic prism in accordance with Comparative Example 2, wavelength characteristics were measured for each color light component when color decomposition was carried out under the incidence condition (with an incident light wavelength of 632.8 nm) shown in FIGS. 15A and 15B, which are a side view and a top plan view, respectively. Though $N_g > N_l$ in this comparative example, the value of $N_h/N_l$ was 1.506, thus failing to satisfy any of the conditional expressions (1) and (2).

FIGS. 10A to 10C show measured results. As can be seen from FIGS. 10A to 10C, large deviations were measured between the characteristics obtained when the luminous flux was initially incident on the blue-reflecting dichroic film and then on the red-reflecting dichroic film (B-R curves (indicated by dotted lines)) and those obtained when the luminous flux was initially incident on the red-reflecting dichroic film and then on the blue-reflecting dichroic film (R-B curves (indicated by solid lines)).

Comparative Example 3

The dichroic film in the cross dichroic prism in accordance with Comparative Example 3 employed BK7 as its prism base, whereas lower refractive index material layers (having a refractive index $N_l$ of 1.470) made of $SiO_2$ and higher refractive index material layers (having a refractive index $N_h$ of 2.081) made of $LaTiO_3$ were alternatively laminated on the prism base by vapor deposition.

Each of the lowermost layer (first layer) and topmost layer of the dichroic film was a lower refractive index material layer made of $SiO_2$. The blue-reflecting dichroic film was constituted by 23 layers, whereas the red-reflecting dichroic film was constituted by 17 layers.

Using the cross dichroic prism in accordance with Comparative Example 3, wavelength characteristics were measured for each color light component when color decomposition was carried out under the incidence condition (with an incident light wavelength of 632.8 nm) shown in FIGS. 15A and 15B, which are a side view and a top plan view, respectively. Though $N_g > N_l$ in this comparative example, the value of $N_h/N_l$ was 1.416, thus failing to satisfy any of the conditional expressions (1) and (2).

FIGS. 11A to 11C show measured results. As can be seen from FIGS. 11A to 11C, large deviations were measured between the characteristics obtained when the luminous flux was initially incident on the blue-reflecting dichroic film and then on the red-reflecting dichroic film (B-R curves (indicated by dotted lines)) and those obtained when the luminous flux was initially incident on the red-reflecting dichroic film and then on the blue-reflecting dichroic film (R-B curves (indicated by solid lines)).

Comparative Example 4

The dichroic film in the cross dichroic prism in accordance with Comparative Example 4 employed BK7 as its prism base, whereas lower refractive index material layers (having a refractive index $N_l$ of 1.470) made of $SiO_2$ and higher refractive index material layers (having a refractive index $N_h$ of 1.820) made of $La_{2X}Al_{2Y}O_{3(X+Y)}$ were alternatively laminated on the prism base by vapor deposition.

Each of the lowermost layer (first layer) and topmost layer of the dichroic film was a lower refractive index material layer made of $SiO_2$. The blue-reflecting dichroic film was constituted by 25 layers, whereas the red-reflecting dichroic film was constituted by 23 layers.

Using the cross dichroic prism in accordance with Comparative Example 4, wavelength characteristics were measured for each color light component when color decomposition was carried out under the incidence condition (with an incident light wavelength of 632.8 nm) shown in FIGS. 15A and 15B, which are a side view and a top plan view, respectively. Though $N_g > N_l$ in this comparative example, the value of $N_h/N_l$ was 1.238, thus failing to satisfy any of the conditional expressions (1) and (2).

FIGS. 12A to 12C show measured results. As can be seen from FIGS. 12A to 12C, large deviations were measured between the characteristics obtained when the luminous flux was initially incident on the blue-reflecting dichroic film and then on the red-reflecting dichroic film (B-R curves (indicated by dotted lines)) and those obtained when the luminous flux was initially incident on the red-reflecting dichroic film and then on the blue-reflecting dichroic film (R-B curves (indicated by solid lines)).

Comparative Example 5

The dichroic film in the cross dichroic prism in accordance with Comparative Example 5 employed BK7 as its prism base, whereas lower refractive index material layers (having a refractive index $N_l$ of 1.470) made of $SiO_2$ and higher refractive index material layers (having a refractive index $N_h$ of 1.715) made of $PrAlO_3$ were alternatively laminated on the prism base by vapor deposition.

Each of the lowermost layer (first layer) and topmost layer of the dichroic film was a lower refractive index material layer made of $SiO_2$. The blue-reflecting dichroic film was constituted by 25 layers, whereas the red-reflecting dichroic film was constituted by 23 layers.

Using the cross dichroic prism in accordance with Comparative Example 5, wavelength characteristics were measured for each color light component when color decomposition was carried out under the incidence condition (with an incident light wavelength of 632.8 nm) shown in FIGS. 15A and 15B, which are a side view and a top plan view, respectively. Though $N_g > N_l$ in this comparative example, the value of $N_h/N_l$ was 1.166, thus failing to satisfy any of the conditional expressions (1) and (2).

FIGS. 13A to 13C show measured results. As can be seen from FIGS. 13A to 13C, large deviations were measured between the characteristics obtained when the luminous flux was initially incident on the blue-reflecting dichroic film and then on the red-reflecting dichroic film (B-R curves (indicated by dotted lines)) and those obtained when the luminous flux was initially incident on the red-reflecting dichroic film and then on the blue-reflecting dichroic film (R-B curves (indicated by solid lines)).

The following Table 5 summarizes the results of the above-mentioned examples and comparative examples.

As explained in the foregoing, the cross dichroic prism in accordance with the present invention and the reflection type liquid crystal projector using the same define the higher and lower refractive index layer materials constituting dichroic films according to a predetermined refractive index function, thereby making it possible to prevent the outgoing light quantity from being changed by different orders of incidence of the luminous flux on the red- and blue-reflecting dichroic films even in a reflection type liquid crystal projector in which a luminous flux from a light source is made obliquely incident on the reflection type liquid crystal display device. This can establish a favorable balance in the tint and optical intensity between right and left parts of images projected onto the screen.

TABLE 1

The refractive index of each substance (at a wavelength of 632.8 nm).

|  |  | Nb$_2$O$_5$ | TiO$_2$ | Ta$_2$O$_5$ | LaTiO$_3$ | HfO2 | ZrO$_2$ | La$_{2X}$Al$_{2Y}$O$_{3(X+Y)}$ | Y$_2$O$_3$ | PrAlO$_3$ | Al$_2$O$_3$ | SiO$_2$ | MgF$_2$ |
|---|---|---|---|---|---|---|---|---|---|---|---|---|---|
|  |  | 2.376 | 2.350 | 2.213 | 2.081 | 1.984 | 1.967 | 1.820 | 1.777 | 1.715 | 1.646 | 1.470 | 1.385 |
| Nb$_2$O$_5$ | 2.376 | 1 | 0.989 | 0.932 | 0.876 | 0.835 | 0.828 | 0.766 | 0.748 | 0.722 | 0.693 | 0.619 | 0.583 |
| TiO$_2$ | 2.350 | 1.011 | 1 | 0.942 | 0.886 | 0.844 | 0.837 | 0.774 | 0.756 | 0.730 | 0.701 | 0.626 | 0.589 |
| Ta$_2$O$_5$ | 2.213 | 1.074 | 1.062 | 1 | 0.940 | 0.896 | 0.889 | 0.822 | 0.803 | 0.775 | 0.744 | 0.664 | 0.626 |
| LaTiO$_3$ | 2.081 | 1.142 | 1.129 | 1.064 | 1 | 0.956 | 0.945 | 0.874 | 0.854 | 0.824 | 0.791 | 0.706 | 0.666 |
| HfO$_2$ | 1.984 | 1.198 | 1.184 | 1.116 | 1.049 | 1 | 0.991 | 0.917 | 0.896 | 0.864 | 0.830 | 0.741 | 0.698 |
| ZrO$_2$ | 1.967 | 1.208 | 1.195 | 1.125 | 1.058 | 1.009 | 1 | 0.925 | 0.903 | 0.872 | 0.837 | 0.747 | 0.704 |
| La$_{2X}$Al$_{2Y}$O$_{3(X+Y)}$ | 1.820 | 1.306 | 1.291 | 1.216 | 1.144 | 1.090 | 1.081 | 1 | 0.976 | 0.941 | 0.905 | 0.808 | 0.761 |
| Y$_2$O$_3$ | 1.777 | 1.337 | 1.323 | 1.246 | 1.171 | 1.117 | 1.107 | 1.024 | 1 | 0.965 | 0.927 | 0.827 | 0.780 |
| PrAlO$_3$ | 1.715 | 1.386 | 1.371 | 1.291 | 1.214 | 1.157 | 1.147 | 1.061 | 1.036 | 1 | 0.960 | 0.857 | 0.808 |
| Al$_2$O$_3$ | 1.646 | 1.443 | 1.427 | 1.344 | 1.264 | 1.205 | 1.195 | 1.105 | 1.079 | 1.041 | 1 | 0.893 | 0.841 |
| SiO$_2$ | 1.470 | 1.616 | 1.599 | 1.506 | 1.416 | 1.350 | 1.338 | 1.238 | 1.209 | 1.166 | 1.118 | 1 | 0.942 |
| MgF$_2$ | 1.385 | 1.716 | 1.697 | 1.598 | 1.503 | 1.432 | 1.420 | 1.314 | 1.283 | 1.238 | 1.189 | 1.061 | 1 |

TABLE 2

| Blue-Reflecting Dichroic Prism | | | Red-Reflecting Dichroic Prism | | |
|---|---|---|---|---|---|
| Layer No. | Substance | Physical thickness (nm) | Layer No. | Substance | Physical thickness (nm) |
| 1 | Al$_2$O$_3$ | 103.85 | 1 | Al$_2$O$_3$ | 83.9 |
| 2 | Ta$_2$O$_5$ | 18.32 | 2 | Ta$_2$O$_5$ | 125.04 |
| 3 | Al$_2$O$_3$ | 52.76 | 3 | Al$_2$O$_3$ | 53.68 |
| 4 | Ta$_2$O$_5$ | 73.47 | 4 | Ta$_2$O$_5$ | 126.29 |
| 5 | Al$_2$O$_3$ | 41.34 | 5 | Al$_2$O$_3$ | 84.33 |
| 6 | Ta$_2$O$_5$ | 74.03 | 6 | Ta$_2$O$_5$ | 117.51 |
| 7 | Al$_2$O$_3$ | 48.78 | 7 | Al$_2$O$_3$ | 85.99 |
| 8 | Ta$_2$O$_5$ | 86.06 | 8 | Ta$_2$O$_5$ | 117.42 |
| 9 | Al$_2$O$_3$ | 43 | 9 | Al$_2$O$_3$ | 72.98 |
| 10 | Ta$_2$O$_5$ | 79.81 | 10 | Ta$_2$O$_5$ | 119.51 |
| 11 | Al$_2$O$_3$ | 48.41 | 11 | Al$_2$O$_3$ | 72.98 |
| 12 | Ta$_2$O$_5$ | 84.79 | 12 | Ta$_2$O$_5$ | 117.42 |
| 13 | Al$_2$O$_3$ | 43.33 | 13 | Al$_2$O$_3$ | 85.99 |
| 14 | Ta$_2$O$_5$ | 84.42 | 14 | Ta$_2$O$_5$ | 117.51 |
| 15 | Al$_2$O$_3$ | 43.83 | 15 | Al$_2$O$_3$ | 84.33 |
| 16 | Ta$_2$O$_5$ | 86.19 | 16 | Ta$_2$O$_5$ | 126.29 |
| 17 | Al$_2$O$_3$ | 41.81 | 17 | Al$_2$O$_3$ | 53.68 |
| 18 | Ta$_2$O$_5$ | 84.15 | 18 | Ta$_2$O$_5$ | 125.04 |
| 19 | Al$_2$O$_3$ | 36.17 | 19 | Al$_2$O$_3$ | 83.9 |
| 20 | Ta$_2$O$_5$ | 84.86 | | | |
| 21 | Al$_2$O$_3$ | 54.52 | | | |
| 22 | Ta$_2$O$_5$ | 25.13 | | | |
| 23 | Al$_2$O$_3$ | 72.19 | | | |

Refractive index of Al$_2$O$_3$ (at a wavelength of 632.8 nm): 1.646
Refractive index of Ta$_2$O$_5$ (at a wavelength of 632.8 nm): 2.213
Refractive index of glass substrate (BK7) (at a wavelength of 632.8 nm): 1.515

TABLE 3

| Blue-Reflecting Dichroic Prism | | | Red-Reflecting Dichroic Prism | | |
|---|---|---|---|---|---|
| Layer No. | Substance | Physical thickness (nm) | Layer No. | Substance | Physical thickness (nm) |
| 1 | SiO$_2$ | 87.35 | 1 | SiO$_2$ | 181.244 |
| 2 | Al$_2$O$_3$ | 68.37 | 2 | Al$_2$O$_3$ | 157.416 |
| 3 | SiO$_2$ | 90.89 | 3 | SiO$_2$ | 167.686 |
| 4 | Al$_2$O$_3$ | 88.92 | 4 | Al$_2$O$_3$ | 144.529 |
| 5 | SiO$_2$ | 103.2 | 5 | SiO$_2$ | 160.096 |
| 6 | Al$_2$O$_3$ | 91.19 | 6 | Al$_2$O$_3$ | 141.38 |
| 7 | SiO$_2$ | 101.19 | 7 | SiO$_2$ | 157.856 |
| 8 | Al$_2$O$_3$ | 90.89 | 8 | Al$_2$O$_3$ | 139.329 |
| 9 | SiO$_2$ | 103.95 | 9 | SiO$_2$ | 156.579 |
| 10 | Al$_2$O$_3$ | 94.12 | 10 | Al$_2$O$_3$ | 138.991 |
| 11 | SiO$_2$ | 104.94 | 11 | SiO$_2$ | 155.763 |
| 12 | Al$_2$O$_3$ | 92.55 | 12 | Al$_2$O$_3$ | 138.991 |
| 13 | SiO$_2$ | 102.94 | 13 | SiO$_2$ | 155.763 |
| 14 | Al$_2$O$_3$ | 92.55 | 14 | Al$_2$O$_3$ | 137.862 |
| 15 | SiO$_2$ | 102.94 | 15 | SiO$_2$ | 155.763 |
| 16 | Al$_2$O$_3$ | 92.55 | 16 | Al$_2$O$_3$ | 138.991 |
| 17 | SiO$_2$ | 104.94 | 17 | SiO$_2$ | 156.579 |
| 18 | Al$_2$O$_3$ | 94.12 | 18 | Al$_2$O$_3$ | 139.329 |
| 19 | SiO$_2$ | 103.95 | 19 | SiO$_2$ | 157.856 |
| 20 | Al$_2$O$_3$ | 90.89 | 20 | Al$_2$O$_3$ | 141.38 |
| 21 | SiO$_2$ | 101.19 | 21 | SiO$_2$ | 160.096 |
| 22 | Al$_2$O$_3$ | 91.19 | 22 | Al$_2$O$_3$ | 144.529 |
| 23 | SiO$_2$ | 103.2 | 23 | SiO$_2$ | 167.686 |
| 24 | Al$_2$O$_3$ | 88.92 | 24 | Al$_2$O$_3$ | 157.416 |
| 25 | SiO$_2$ | 90.89 | 25 | SiO$_2$ | 181.244 |
| 26 | Al$_2$O$_3$ | 68.37 | | | |
| 27 | SiO$_2$ | 87.35 | | | |

Refractive index of SiO$_2$ (at a wavelength of 632.8 nm): 1.470
Refractive index of Al$_2$O$_3$ (at a wavelength of 632.8 nm): 1.646
Refractive index of glass substrate (BK7) (at a wavelength of 632.8 nm): 1.515

TABLE 4

| Blue-Reflecting Dichroic Prism | | | Red-Reflecting Dichroic Prism | | |
|---|---|---|---|---|---|
| Layer No. | Substance | Physical thickness (nm) | Layer No. | Substance | Physical thickness (nm) |
| 1 | SiO$_2$ | 100 | 1 | SiO$_2$ | 241.5 |
| 2 | Ta$_2$O$_5$ | 28.372 | 2 | Ta$_2$O$_5$ | 131.117 |
| 3 | SiO$_2$ | 64.661 | 3 | SiO$_2$ | 66.961 |
| 4 | Ta$_2$O$_5$ | 75.857 | 4 | Ta$_2$O$_5$ | 134.534 |
| 5 | SiO$_2$ | 46.521 | 5 | SiO$_2$ | 97.904 |
| 6 | Ta$_2$O$_5$ | 73.768 | 6 | Ta$_2$O$_5$ | 127.069 |
| 7 | SiO$_2$ | 50.276 | 7 | SiO$_2$ | 92.539 |
| 8 | Ta$_2$O$_5$ | 87.893 | 8 | Ta$_2$O$_5$ | 127.024 |
| 9 | SiO$_2$ | 44.185 | 9 | SiO$_2$ | 80.771 |
| 10 | Ta$_2$O$_5$ | 79.187 | 10 | Ta$_2$O$_5$ | 127.474 |
| 11 | SiO$_2$ | 49.573 | 11 | SiO$_2$ | 87.472 |
| 12 | Ta$_2$O$_5$ | 85.16 | 12 | Ta$_2$O$_5$ | 128.901 |

TABLE 4-continued

| Blue-Reflecting Dichroic Prism | | | Red-Reflecting Dichroic Prism | | |
|---|---|---|---|---|---|
| Layer No. | Substance | Physical thickness (nm) | Layer No. | Substance | Physical thickness (nm) |
| 13 | $SiO_2$ | 44.62 | 13 | $SiO_2$ | 91.953 |
| 14 | $Ta_2O_5$ | 84.282 | 14 | $Ta_2O_5$ | 133.699 |
| 15 | $SiO_2$ | 44.819 | 15 | $SiO_2$ | 74.359 |
| 16 | $Ta_2O_5$ | 85.572 | 16 | $Ta_2O_5$ | 130.831 |
| 17 | $SiO_2$ | 43.433 | 17 | $SiO_2$ | 39.016 |
| 18 | $Ta_2O_5$ | 83.708 | | | |
| 19 | $SiO_2$ | 37.392 | | | |
| 20 | $Ta_2O_5$ | 85.471 | | | |
| 21 | $SiO_2$ | 62.3 | | | |
| 22 | $Ta_2O_5$ | 31.056 | | | |
| 23 | $SiO_2$ | 82.966 | | | |

Refractive index of $SiO_2$ (at a wavelength of 632.8 nm): 1.470
Refractive index of $Ta_2O_5$ (at a wavelength of 632.8 nm): 2.213
Refractive index of glass substrate (BK7) (at a wavelength of 632.8 nm): 1.515

TABLE 5

| Higher refractive index substance | | Lower refractive index substance | | Refractive index ratio | Results | Number of multilayer film layers | |
|---|---|---|---|---|---|---|---|
| Substance | Refractive index | Substance | Refractive index | | | Blue-reflect | Red-reflect |
| $Ta_2O_5$ | 2.213 | $Al_2O_3$ | 1.646 | 1.344 | o | 23 | 19 |
| $TiO_2$ | 2.350 | $PrAlO_3$ | 1.715 | 1.371 | o | 23 | 19 |
| $TiO_2$ | 2.350 | $Al_2O_3$ | 1.646 | 1.427 | o | 23 | 19 |
| $LaTiO_3$ | 2.081 | $Al_2O_3$ | 1.646 | 1.264 | o | 23 | 19 |
| $Al_2O_3$ | 1.646 | $SiO_2$ | 1.470 | 1.120 | o | 27 | 25 |
| $TiO_2$ | 2.350 | $SiO_2$ | 1.470 | 1.599 | x | 23 | 17 |
| $Ta_2O_5$ | 2.213 | $SiO_2$ | 1.470 | 1.506 | x | 23 | 17 |
| $LaTiO_3$ | 2.081 | $SiO_2$ | 1.470 | 1.416 | x | 23 | 17 |
| $La_{2X}Al_{2Y}O_{3(X+Y)}$ | 1.820 | $SiO_2$ | 1.470 | 1.238 | x | 25 | 23 |
| $PrAlO_3$ | 1.715 | $SiO_2$ | 1.470 | 1.166 | x | 25 | 23 |

What is claimed is:

1. A cross dichroic prism for color decomposition, the cross dichroic prism being mounted with a reflection type liquid crystal projector for making a luminous flux from a light source obliquely incident on a reflection type liquid crystal display device, the cross dichroic prism transmitting a green color light component therethrough and reflecting blue and red color light components into directions different from each other upstream of the reflection type liquid crystal display device;

the cross dichroic prism comprising a blue-reflecting dichroic film for reflecting the blue light component and a red-reflecting dichroic film for reflecting the red light component, each of the blue- and red-reflecting dichroic films comprising lower and higher refractive index materials alternately laminated on a prism base;

the cross dichroic prism satisfying the following conditional expressions (1) or (2):

$$1.105 \leq N_h/N_l \leq 1.450 \text{ if } N_g \leq N_l \quad (1), \text{ or}$$

$$1.118 \leq N_h/N_l \leq 1.150 \text{ if } N_g > N_l \quad (2)$$

where $N_g$ is the refractive index of the prism base, $N_h$ is the refractive index of the higher refractive index material, and $N_l$ is the refractive index of the lower refractive index material;

wherein the luminous flux from the light source is incident on an entrance surface of the cross dichroic prism at an angle making the luminous flux oblique to the entrance surface when viewed from a side and perpendicular to the entrance surface when viewed from a top side of the cross dichroic prism;

wherein a top side is defined as a view when viewed from a top surface in which two dichroic surfaces are shown as crossed, and wherein a side is defined as a view when viewed from each of two surfaces perpendicular to the entrance surface among four side surfaces.

2. A cross dichroic prism according to claim 1, wherein the cross dichroic prism satisfies the conditional expression (1) ; wherein the higher refractive index material is a material selected from the group consisting of $Nb_2O_5$, $TiO_2$, $Ta_2O_5$, $LaTiO_3$, $HfO_2$, $ZrO_2$, and $La_{2X}Al_{2Y}O_{3(X+Y)}$; and wherein the lower refractive index material is a material selected from the group consisting of $LaTiO_3$, $HfO_2$, $ZrO_2$, $La_{2X}AL_{2Y}O_{3(X+Y)}$, $Y_2O_3$, $PrAlO_3$, and $Al_2O_3$.

3. A cross dichroic prism according to claim 2, wherein the prism base is a glass material made of BK7.

4. A cross dichroic prism according to claim 1, wherein the cross dichroic prism satisfies the conditional expression (2); wherein the higher refractive index material is $Al_2O_3$; and wherein the lower refractive index material is $SiO_2$.

5. A cross dichroic prism according to claim 4, wherein the prism base is a glass material made of BK7.

6. A cross dichroic prism according to claim 1, wherein the blue-reflecting dichroic film is constituted by 23 to 29 layers; and wherein the red-reflecting dichroic film is constituted by 19 to 25 layers.

7. A cross dichroic prism according to claim 1, wherein, in the blue- and red-reflecting dichroic films, at least one of lowermost and uppermost layers is a layer made of the lower refractive index material.

8. A cross dichroic prism according to claim 7, wherein at least one of the blue- and red-reflecting dichroic films is constituted by an odd number of layers.

9. A reflection type liquid crystal projector comprising the cross dichroic prism according to claim 1, wherein the luminous flux from the light source is incident on an entrance surface of the cross dichroic prism at an angle making the luminous flux oblique to the entrance surface when viewed from a side and perpendicular to the entrance surface when viewed from a top side of the cross dichroic prism.

* * * * *